United States Patent
Singh et al.

(10) Patent No.: US 10,169,547 B2
(45) Date of Patent: Jan. 1, 2019

(54) SECURE COMPUTING SYSTEM RECORD TRANSFER CONTROL

(71) Applicant: Microsoft Technology Licensing, LLC, Redmond, WA (US)

(72) Inventors: Jaskaran Singh, Redmond, WA (US); Dipak S. Pawar, Seattle, WA (US); Andrew W. Lu, Rockville, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/861,424

(22) Filed: Sep. 22, 2015

(65) Prior Publication Data

US 2017/0061104 A1    Mar. 2, 2017

Related U.S. Application Data

(60) Provisional application No. 62/211,297, filed on Aug. 28, 2015.

(51) Int. Cl.
  *G06F 21/10*    (2013.01)
  *G06F 21/62*    (2013.01)
  *G06Q 10/10*    (2012.01)

(52) U.S. Cl.
  CPC .......... *G06F 21/10* (2013.01); *G06F 21/6245* (2013.01); *G06Q 10/109* (2013.01)

(58) Field of Classification Search
  CPC .... G06F 21/10; G06F 21/6245; G06Q 10/109
  See application file for complete search history.

(56) References Cited

U.S. PATENT DOCUMENTS

| 4,135,240 | A | 1/1979 | Ritchie |
| 6,219,694 | B1 * | 4/2001 | Lazaridis ............... H04L 51/14 455/556.1 |
| 6,411,605 | B1 | 6/2002 | Vance et al. |
| 6,941,349 | B2 | 9/2005 | Godfrey et al. |

(Continued)

FOREIGN PATENT DOCUMENTS

| EP | 2096588 A1 | 9/2009 |
| WO | 2005053323 A2 | 6/2005 |

OTHER PUBLICATIONS

Stead, Claire, "How to Transfer Ownership of a Google Calendar Event", Published on: Nov. 2014 Available at: http://www.appscare.com/2014/11/how-to-transfer-ownership-of-a-google-calendar-event/.

(Continued)

*Primary Examiner* — Saleh Najjar
*Assistant Examiner* — Louis C Teng
(74) *Attorney, Agent, or Firm* — Christopher J. Volkmann; Kelly, Holt & Christenson, PLLC

(57) ABSTRACT

A computing system record security architecture comprises, in one example, a record generation component configured to generate a record in a computing system, the record having an owner property that identifies a first user as an owner of the record, a record security component configured to control modification of the record based on the owner property of the record, and a record ownership transfer component configured to receive an indication of an ownership transfer of the record from the first user to a second user and to modify the owner property to identify the second user as the owner of the record.

20 Claims, 19 Drawing Sheets

(56) References Cited

U.S. PATENT DOCUMENTS

| | | | |
|---|---|---|---|
| 7,200,608 B2* | 4/2007 | Rimer | G06F 9/4435 |
| | | | 707/999.101 |
| 7,343,008 B1 | 3/2008 | Frankel | |
| 7,593,951 B2* | 9/2009 | Rimer | G06F 9/4435 |
| 7,933,789 B2 | 4/2011 | Boland et al. | |
| 7,937,442 B2 | 5/2011 | Sekaran et al. | |
| 8,121,953 B1 | 2/2012 | Orttung et al. | |
| 8,200,520 B2 | 6/2012 | Chen et al. | |
| 8,359,540 B2 | 1/2013 | Darling | |
| 8,583,784 B2 | 11/2013 | Beebe et al. | |
| 8,826,390 B1 | 9/2014 | Varda | |
| 9,106,761 B2* | 8/2015 | Hersh | H04M 1/72552 |
| 9,143,542 B1 | 9/2015 | Tseytlin | |
| 9,325,599 B2* | 4/2016 | Do | H04L 43/10 |
| 9,871,801 B2 | 1/2018 | Singh et al. | |
| 9,954,863 B2 | 4/2018 | Singh et al. | |
| 2002/0184521 A1 | 12/2002 | Lucovsky et al. | |
| 2003/0110228 A1* | 6/2003 | Xu | G06Q 10/10 |
| | | | 709/207 |
| 2003/0163705 A1* | 8/2003 | Richards, Jr. | G06F 21/6218 |
| | | | 713/182 |
| 2005/0034079 A1 | 2/2005 | Gunasekar et al. | |
| 2005/0091265 A1* | 4/2005 | Rimer | G06F 9/4435 |
| 2005/0273372 A1 | 12/2005 | Bane et al. | |
| 2006/0149828 A1 | 7/2006 | Kikinis | |
| 2006/0265456 A1 | 11/2006 | Dietrich | |
| 2007/0094301 A1* | 4/2007 | Rimer | G06F 9/4435 |
| 2007/0118415 A1 | 5/2007 | Chen et al. | |
| 2007/0143399 A1 | 6/2007 | Qi | |
| 2007/0162398 A1* | 7/2007 | Tadayon | G06Q 10/10 |
| | | | 705/54 |
| 2007/0197239 A1 | 8/2007 | Sane | |
| 2008/0235336 A1 | 9/2008 | Stern et al. | |
| 2008/0270211 A1 | 10/2008 | Vander Veen et al. | |
| 2008/0294999 A1 | 11/2008 | Bank et al. | |
| 2009/0172097 A1 | 7/2009 | O'Sullivan et al. | |
| 2009/0216953 A1 | 8/2009 | Rao et al. | |
| 2009/0222747 A1 | 9/2009 | May et al. | |
| 2009/0254978 A1 | 10/2009 | Rouskov et al. | |
| 2009/0307605 A1 | 12/2009 | Ryan et al. | |
| 2009/0319926 A1 | 12/2009 | Chakra et al. | |
| 2010/0083134 A1 | 4/2010 | Gnech et al. | |
| 2010/0088753 A1* | 4/2010 | Ayres | G06F 21/41 |
| | | | 726/9 |
| 2010/0091687 A1 | 4/2010 | Beers et al. | |
| 2010/0106548 A1 | 4/2010 | Barnea et al. | |
| 2010/0169145 A1 | 7/2010 | O'Sullivan et al. | |
| 2010/0246450 A1 | 9/2010 | Basu et al. | |
| 2011/0119598 A1 | 5/2011 | Traylor et al. | |
| 2011/0161284 A1* | 6/2011 | Tewari | G06F 17/30371 |
| | | | 707/609 |
| 2011/0258561 A1 | 10/2011 | Ladouceur et al. | |
| 2011/0317523 A1 | 12/2011 | Lance et al. | |
| 2012/0079038 A1* | 3/2012 | Hersh | H04M 1/72552 |
| | | | 709/206 |
| 2012/0136689 A1 | 5/2012 | Ickman et al. | |
| 2012/0173356 A1 | 7/2012 | Fan et al. | |
| 2012/0278276 A1 | 11/2012 | Bailor et al. | |
| 2013/0054295 A1 | 2/2013 | Bhogal et al. | |
| 2013/0110922 A1 | 5/2013 | Shih et al. | |
| 2013/0294260 A1* | 11/2013 | Do | H04L 43/10 |
| | | | 370/250 |
| 2014/0081688 A1 | 3/2014 | Kotak | |
| 2014/0109210 A1 | 4/2014 | Borzycki et al. | |
| 2014/0172799 A1 | 6/2014 | Dorman | |
| 2014/0200944 A1 | 7/2014 | Henriksen et al. | |
| 2014/0316872 A1 | 10/2014 | Lee | |
| 2015/0032827 A1* | 1/2015 | Tyler | H04L 51/16 |
| | | | 709/206 |
| 2015/0111550 A1 | 4/2015 | Kaye et al. | |
| 2015/0186850 A1 | 7/2015 | Ramji | |
| 2015/0350221 A1 | 12/2015 | Espinosa et al. | |
| 2016/0065672 A1 | 3/2016 | Savage et al. | |
| 2016/0307162 A1 | 10/2016 | Bathiya | |
| 2017/0063856 A1 | 3/2017 | Singh et al. | |
| 2017/0063867 A1 | 3/2017 | Singh et al. | |
| 2017/0300872 A1 | 10/2017 | Brown et al. | |
| 2018/0183803 A1 | 6/2018 | Singh et al. | |

OTHER PUBLICATIONS

"Google Calendar for Administrative Assistants", Retrieved on: Jul. 6, 2015 Available at: https://docs.google.com/document/d/1rJkSaZevyZF5hCxaoPjmnkeub8SJRPkFQx8LUUOIzU/edit?hl=en&pli=1#.

"Make Someone Else the Host: It Cornell", Published on: Oct. 30, 2014 Available at: http://www.it.cornell.edu/services/webconferencing/howto/webex/host.cfm.

"dito", Retrieved on: Jul. 6, 2015 Available at: http://www.ditoweb.com/how-to-transfer-ownership-of-a-shared-calendar/.

"Collaboration Tools Community", Retrieved on: Jul. 6, 2015 Available at: https://community.gotomeeting.com/gotomeeting/topics/transfer_meeting_to_new_account.

"GoToMeeting", Retrieved on: Jul. 6, 2015 Available at: http://support.citrixonline.com/en__US/Meeting/help_files/G2M040005?Title=Add+Co-Organizers.

Rose, Michael, "Exchange/iOS "meeting hijack" history goes back well before iOS 6", Published on: Oct. 4, 2012, Available at: http://www.engadget.com/2012/10/04/exchange-ios-meeting-hijack-history-goes-back-well-before-ios/.

"Bug Report: Mobile Devices Hijacking Calendar Events", Published on: Dec. 14, 2012, Available at: http://www.it.cornell.edu/services/guides/facstaff_email/mobile-hijack.cfm.

"Setting Up Appointments, Meetings & Events", Retrieved on: Jul. 6, 2015, Available at: http://guides.myonlinehelp.net/docs/ptsi.net/zevents.

"Microsoft Exchange Server Forged Meeting Request Spoofing Vulnerability", Published on: Mar. 10, 2015, Available at: http://tools.cisco.com/security/center/viewAlert.x?alertId=37676.

"iOS 6.0.1 Software Update", Published on: Nov. 1, 2012, Availabie at: https://support.apple.com/kb/DL1606?locale=en_GB.

"Notes about Delegating Meetings", Published on: Jan. 19, 2015 Available at: http://www.it.cornell.edu/services/webconferencing/howto/webex/delegate-notes.cfm.

"Transfer Event Ownership", Retrieved on: Jul. 3, 2015 Availabie at: https://support.google.com/calendar/answer/117190?hl=en.

"Delegate Calendar Access", Retrieved on: Jul. 3, 2015 Available at: https://support.google.com/a/answer/117596?hl=en.

"Delegating Access to Email, Calendar and other Nexus Features using Entourage Web Services", Retrieved on: Jul. 3, 2015 Available at: https://help.it.ox.ac.uk/nexus/entouragewebservices/delegate.

"Share Your Calendar", Published on: Dec. 1, 2013 Available at: http://windows.microsoft.com/en-IN/windows-live/calendar-share-calendar-with-contacts.

Chase, Lisa, "Discover the power of Calendar Delegation in Lotus Notes", Published on: Feb. 27, 2006 Available at: http://www.ibm.com/developerworks/lotus/library/calendar-delegation/.

Application and Drawings for U.S. Appl. No. 14/850,466, filed Sep. 10, 2015, 66 pages.

Application and Drawings for U.S. Appl. No. 14/839,052, filed Aug. 28, 2015, 42 pages.

Non-Final Office Action for U.S. Appl. No. 14/850,466 dated Nov. 1, 2016, 13 pages.

International Search Report and Written Opinion for International Patent Application No. PCT/US2016/048803, dated Oct. 20, 2016, date of filing: Aug. 26, 2016, 13 pages.

"Amazon Simple Storage Service-Developer Guide-API Version Mar. 1, 2006", Dec. 31, 2014, Retrieved from the Internet: <<URL:http://awsdocs.s3.amazonaws.com/S3/20060301/s3-dg-20060301.pdf>>, Retrieved on Feb. 23, 2016, 554 pages.

"User Rights and Permissions when Accessing Resources", In: John A Price et al.: "Mastering Active Directory for Windows Server 2008", Jun. 30, 2008, 4 pages.

(56) References Cited

OTHER PUBLICATIONS

International Search Report and Written Opinion for International Patent Application No. PCT/US2016/048804, dated Nov. 3, 2016, date of filing: Aug. 26, 2016, 12 pages.
International Search Report and Written Opinion for International Patent Application No. PCT/US2016/048805, dated Nov. 3, 2016, date of filing: Aug. 26, 2016, 12 pages.
Amendment for U.S. Appl. No. 14/850,466 dated Jan. 10, 2017, 11 pages.
Final Office Action for U.S. Appl. No. 14/850,466 dated Mar. 30, 2017, 15 pages.
Final Office Action for U.S. Appl. No. 14/839,052 dated Oct. 20, 2017, 8 pages.
Notice of Allowance for U.S. Appl. No. 14/850,466 dated Aug. 7, 2017, 19 pages.
Non-Final Office Action for U.S. Appl. No. 14/839,052 dated Apr. 12, 2017, 13 pages.
Amendment with RCE for U.S. Appl. No. 14/850,466 dated Jun. 28, 2017, 16 pages.
Second Written Opinion for International Patent Application No. PCT/US2016/048804, dated Jul. 3, 2017, filing date: Aug. 26, 2016, 5 pages.
Amendment for U.S. Appl. No. 14/839,052 dated Jul. 11, 2017, 12 pages.
Second Written Opinion for International Patent Application No. PCT/US2016/048805, dated Jul. 4, 2017, filing date: Aug. 26, 2016, 6 pages.
"International Preliminary Report on Patentability Issued in PCT Application No. PCT/US2016/048805", dated Sep. 28, 2017, 7 Pages.
"Corrected International Preliminary Report on Patentability Issued in PCT Application No. PCT/US2016/048805", dated Mar. 6, 2018, 4 Pages.
"Notice on Allowance Issued in U.S. Appl. No. 14/839,052", dated Jan. 12, 2018, 9 Pages.
"Non Final Office Action Issued in U.S. Appl. No. 15/805,207", dated Jun. 20, 2018, 16 Pages.
Crocker, D. et al., "DomainKeys Identified Mail (DKIM) Signatures (No. RFC 6376)", Retrieved From: https://tools.ietf.org/html/rfc6376, In Internet Engineering Task Force (IEFT), Sep. 2011, 76 Pages.
"International Preliminary Report on Patentability Issued in PCT Application No. PCT/US2016/048804", dated Sep. 28, 2017, 8 Pages.
"It's about time", retrieved at <<https://googleblog.blogspot.in/2006/04/its-about-time.html>>, dated Apr. 13, 2006, 2 pages.
"Quick Tip: Create and share a Google Calendar", retrieved at<<https://www.techrepublic.com/blog/google-in-the-enterprise/quick-tip-create-and-share-a-google-calendar/>>, dated May 9, 2013, 15 pages.
"How to set up Calendar delegation", YouTube: https://www.youtube.com/watch?v=7Vr01XLtHEQ, May 27, 2015, 5 pages.

\* cited by examiner

| NAME | TYPE |
|---|---|
| PROPOSED OWNER | UNIQUE IDENTIFIER OF USER |
| OWNER TRANSFER PENDING | BOOLEAN |
| PREVIOUS OWNER | UNIQUE IDENTIFIER OF USER |

FIG. 9

| NAME | TYPE | NOTES |
|---|---|---|
| PROPOSED OWNER | UNIQUE IDENTIFIER OF USER | |
| OWNERSHIP TRANSFER REQUEST TYPE | ENUM | "NONE", "PROPOSAL", OR "ENACTING" |

FIG. 10

SECURE COMPUTING SYSTEM RECORD TRANSFER CONTROL

CROSS-REFERENCE TO RELATED APPLICATION

The present application is based on and claims the benefit of U.S. provisional patent application Ser. No. 62/211,297, filed Aug. 28, 2015, the content of which is hereby incorporated by reference in its entirety.

BACKGROUND

Computing systems are currently in wide use. As one example, a computing system stores data as entities or other data records, and commonly includes process functionality that facilitates performing various processes or tasks on the data. Users log into or otherwise access the computing system in order to perform the processes and tasks. The data can include user data as well as entities or records that are used to describe various aspects of the computing system.

The data records (or entities) can be of any of a variety of different types. For example, in an enterprise system such as a customer resource management (CRM) or enterprise resource planning (ERP) system, a record can comprise data for an organization. Some examples include sales records, customer records, opportunity records, employee records, etc. In the context of a calendaring application, for example, an event record includes data for a particular event, such as a meeting. In one particular example, a meeting record can define a date, time, location, subject matter or description, as well as associated users or invitees for a meeting event.

The discussion above is merely provided for general background information and is not intended to be used as an aid in determining the scope of the claimed subject matter.

SUMMARY

A computing system record security architecture comprises, in one example, a record generation component configured to generate a record in a computing system, the record having an owner property that identifies a first user as an owner of the record, a record security component configured to control modification of the record based on the owner property of the record, and a record ownership transfer component configured to receive an indication of an ownership transfer of the record from the first user to a second user and to modify the owner property to identify the second user as the owner of the record.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 5-1 and 5-2 are a flow diagram of one example of a method for receiving and processing an event message.

FIGS. 6-1 and 6-2 is a flow diagram of one example of a method for transferring ownership of a record.

FIG. 9 illustrates a set of record properties for reflecting a proposed ownership change, in one example.

FIG. 10 illustrates one example of a set of properties for an ownership transfer request email.

DETAILED DESCRIPTION

The present disclosure generally relates to a security architecture for creating computing system records and enforcing record ownership privileges. Before describing embodiments of the security architecture in detail, a brief overview of record creation and ownership will be provided for the sake of illustration, but not by limitation.

In one particular example, a first user creates an event record (e.g., a meeting record) by defining a set of attributes, including a set of invitees and other event data such as location, data, time, etc. This event record is stored in the first user's system, and an event message comprising a record generation request is sent to the invitees. For instance, the first user's email server sends an email to the email server(s) of the invitees to replicate the event record in the invitees' system(s) as well. This type of architecture is often referred to as an email replication system, as opposed to a system that uses cross-server calls directly between servers. It is noted that the mailboxes of the invitees can be on the same server and/or different servers from the first user.

The first user is considered the event organizer, and thus the owner of the event record. The organizer, or owner, has a set of ownership privileges over the record which allows the organizer to modify the record, including updating and/or deleting the record.

In response to the requests sent by the first user, the invitees can accept or decline the event invitation. In this example, copies of the event record are created and stored within the invitees' system(s). Thus, the invitee users do not access the owner's event record directly, but rather copies of the event record created in the invitee's mailbox or other server component.

In some scenarios, when a non-owner invitee user declines or rejects the event invitation, or attempts to modify the event record data (e.g., changing the time or location), the user's client sends out an event message that is improperly asserted or interpreted as an event modification or cancellation request, as if the non-owner invitee were actually the owner of the event record. That is, the non-owner invitee asserts ownership privileges over the record resulting in the record being inadvertently modified or cancelled. This is often referred to as "hijacking" the event record from the owner. Record hijacking may occur unintentionally, or intentionally (e.g., a non-owner user intentionally generates an event message in an attempt to hijack the event record from the owner). In either case, the system does not accurately determine whether it was the owner or organizer of the event who sent out the update or cancellation request, and thus may honor unauthorized requests.

Figure 1:
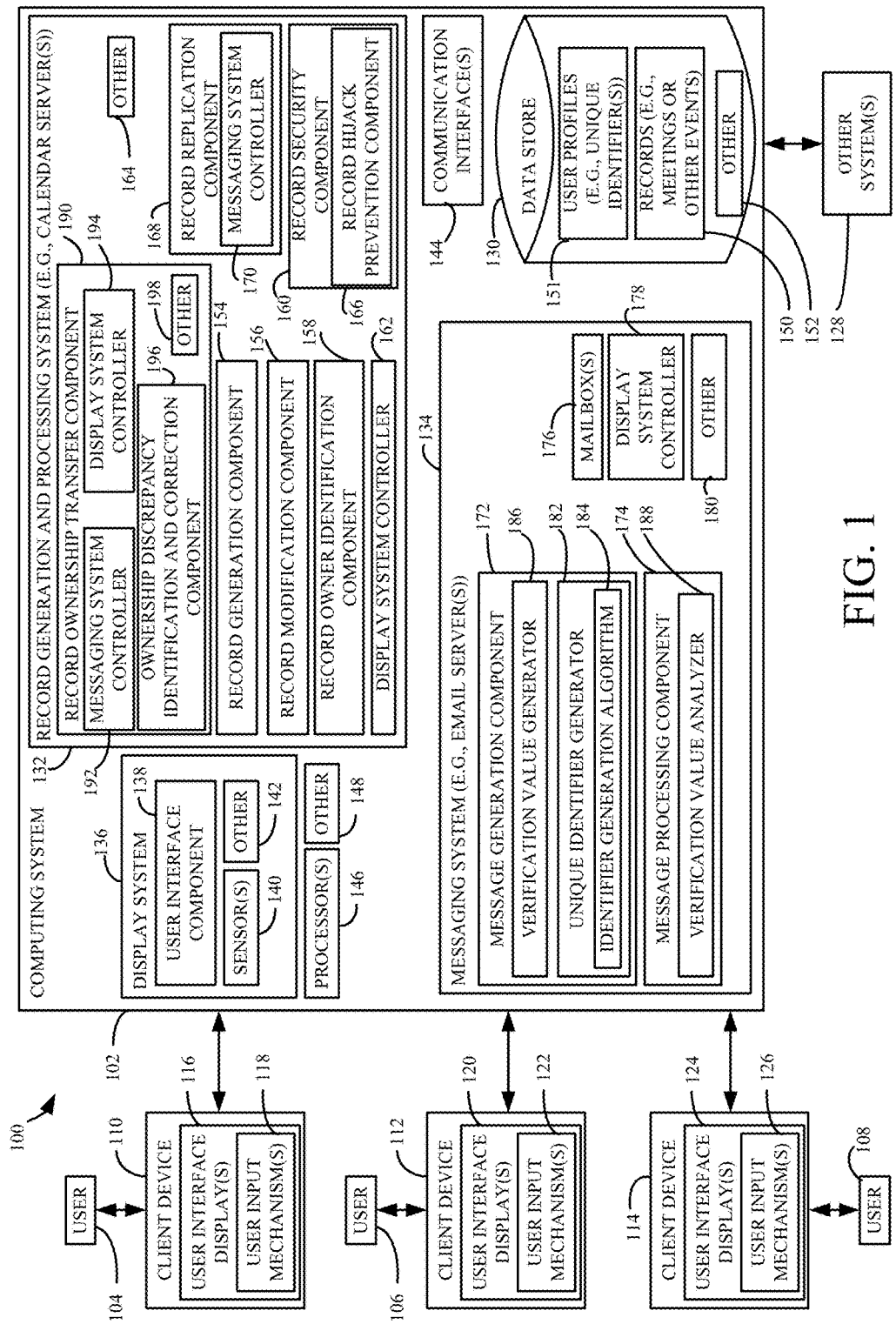
FIG. 1 is a block diagram of one example of a computing system record security architecture.

FIG. 1 is a block diagram of one example of a computing system record security architecture 100 configured to prevent record hijacking, regardless of whether the hijack attempts are intentional or unintentional. Before describing architecture 100 in further detail, it is noted that for the sake of illustration, but not by limitation, examples will be described herein in the context of event records (e.g., meeting records), and replicating or synchronizing the records between associated users (e.g., invitees) using email messages. However, this is by way of example only, other types of records and systems for communicating records to associated users are within the scope of the described subject matter.

Architecture 100 includes a computing system 102 that is accessible by one or more users through one or more user interface displays. In the illustrated example, users 104, 106, and 108 are illustrated accessing computing system 102 using respective client devices 110, 112, and 114. Client devices 110, 112, and 114 can be any of a wide variety of computing devices including, but not limited to, desktop computers, laptop computers, personal digital assistance, mobile phones, tablet computers, e-reader devices, etc. Further, a given user may access architecture 100 using a plurality of different user devices.

As illustrated, user 104 interacts with user interface display(s) 116 with user input mechanism(s) 118, user 106 interacts with user interface display(s) 120 having user input mechanism(s) 122, and user 108 interacts with user interface display(s) 124 having user input mechanism(s) 126. In FIG. 1, three users are illustrated interacting with computing system 102, for sake of illustration. However, in other examples, any number of users may interact with computing system 102. Further, computing system 102 may interact with other system(s) 128 used by other users.

Users 104, 106, and 108 can access computing system 102 locally or remotely. In the illustrated example, users 104, 106, and 108 use respective client devices that communicate with computing system 102 over a wide area network, such as the Internet. In one implementation, users 104, 106 and 108 utilize their client devices to store and retrieve data relative to "cloud-based" servers. In another example, components can be run at least partially from client devices 110, 112, and 114.

The users interact with the user input mechanisms in order to control and manipulate computing system 102. For example, using the user input mechanisms, the users can access data in a data store 130 and/or implement functionality of a record generation and processing system 132 and a messaging system 134.

User interface displays 116, 120 and 124 can be generated in any of a variety of different ways. In one example, computing system 102 includes a display system 136 having a user interface component 138, one or more sensors 140, and can include other components 142 as well. User interface component 138 is configured to generate user interface displays that are rendered on a client device, for a web browser or other interface. For instance, web pages can be requested, dynamically generated, and transmitted for rendering on the client devices. Sensor(s) 140 are configured to detect inputs to display system 136. In one example, systems 132 and 134 can include sensors configured to detect inputs to those systems.

In another example, one or more of client devices 110, 112, and 114 have client applications installed thereon to generate the respective user interface displays and detect inputs from the user.

User input mechanisms 118, 122, and 126 sense physical activities, for example by generating the user interface displays that are used to sense user interaction with computing system 102. The user interface displays can include user input mechanisms that sense user input in a wide variety of different ways, such as point and click devices (e.g., a computer mouse or track ball), a keyboard (either virtual or hardware) and/or a keypad. Where the user device used to display the user interface display is a touch-sensitive display, the inputs can be provided as touch gestures. Similarly, the user inputs can be provided by voice inputs or other natural user interface input mechanisms as well.

Computing system 102 also includes one or more communication interfaces 144, one or more processors 146, and can include other components 148 as well. Communication interface(s) are configured to communicate with client devices 110, 112, and 114, as well as other system(s) 128.

Processor(s) 146 comprises a computer processor with associated memory and timing circuitry (not shown). The processor is illustratively a functional part of system 102 and is activated by, and facilitates the functionality of, other systems, components and items in computing system 102.

While FIG. 1 shows a variety of different functional blocks, it will be noted that the blocks can be consolidated so that more functionality is performed by each block, or they can be divided so that their functionality is further distributed. It should also be noted that data store 130 can be any of a variety of different types of data stores. Further, data store 130 can be stored in multiple data stores. Also, the data store(s) can be local to the environments, agents, modules, and/or components that access them, or they can be remote therefrom and accessed by those environments, agents, modules and/or components. Similarly, some can be local while others are remote.

Computing system 102 can include applications that are executed using an application component that facilitates functionality within computing system 102. By way of example, an application component can access information in data store 130. For example, data store 130 can store data and metadata. The data and metadata can define workflows, processes, entities and a wide variety of other information. By way of example, entities stored in data store 130 can comprise or otherwise define items within computing system 102. For instance, entities in an enterprise system can include account entities that define various features of an account, customer entities that define various features of a customer, sales entities that define various features of sales that can occur during a sales process, and many other types of entities or objects. For instance, the entities can include or other define events, such as meetings. Further yet, entities can comprise documents, such as articles and emails, to name a few. The entities can be stored in data store 130 as records 150. Data store 130 can include user profiles 151, and can include other items 152 as well.

Record generation and processing system 132 is illustratively configured to generate and process records, such as records for meetings or other events. In one example, system 132 comprises one or more calendar servers.

System 132 includes a record generation component 154, a record modification component 156, a record owner identification component 158, a record security component 160, a display system controller 162, and can include other items 164 as well. Using display system controller 162, record generation component 154 can control display system 136 to generate and render user interface displays that receive record generation requests to generate records 150 in data store 130. For instance, through the user interface displays, user 104 defines a meeting event for which a record 150 is stored in data store 130.

Figure 2:
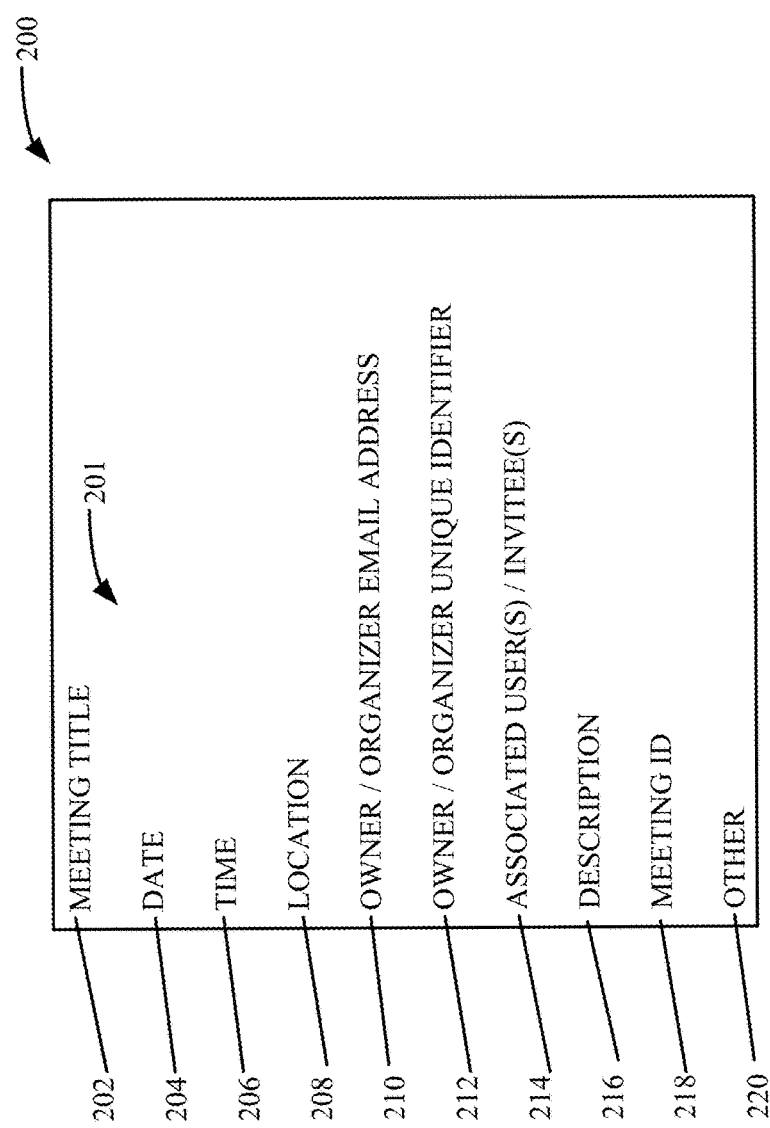
FIG. 2 illustrates one example of a meeting record.

FIG. 2 illustrates one example of a meeting record 200. Meeting record 200 comprises a plurality of fields 201 storing attributes for the meeting record including, but not limited to, a meeting title property 202, a date property 204, a time property 206, a location property 208, an owner or organizer email address (or ID) property 210, an owner or organizer unique identifier property 212, and associated users or invitees property 214, a description property 216, a meeting ID field 218 that uniquely identifies the meeting, and can include other properties 220 as well. Meeting record 200 can be stored in any suitable form including, but not limited to, a table.

Referring again to FIG. 1, record modification component 156 is configured to modify records 150 stored in data store 130. For instance, an owner of a given record may issue a modification request to update the event record (e.g., cancel the event, change the location or time of the event, add additional recipients, etc.). Record owner identification component 158 is configured to identify the owner of a given record and record security component 160 is configured to enforce ownership or other privileges on records 150. For instance, record security component 160 includes a record hijack prevention component 166 that is configured to prevent record hijacking by unauthorized users. This is discussed in further detail below.

In the illustrated example, architecture 100 uses email (or other messaging) to replicate records for associated users (e.g., meeting invitees). As shown in FIG. 1, system 132 includes a record replication component 168 having a messaging system controller 170 configured to control messaging system 134. This is discussed in further detail below. Briefly, however, when a user (e.g., user 104) generates or modifies a record 150 using components 154 and/or 156, record replication component 168 operates to replicate that record for associated users. In the case of a event record having a set of invitees, messaging system controller 170 controls messaging system 134 to generate and send a message (i.e., an email in the present example) to each of the invitee users such that the record is replicated in those user's systems as well. It is noted that the invitee users can reside on the same system (e.g., the same email server) as the owner who generated the record or a different system or server (e.g., such as systems 128).

Messaging system 134 comprises, in one example, one or more email servers. As shown in FIG. 1, messaging system 134 includes a message generation component 172, a message processing component 174, one or more mailboxes 176, a display system controller 178, and can include other components 180 as well. Display system controller 178 is configured to control display system 136 to generate user interface displays that facilitate functionality for a user to create, edit, and send emails using component 172, as well as to view emails received in the user's mailbox 176. Message processing component 174 is configured to process messages received by messaging system 134, such as to parse an email to identify various properties and other data.

In the illustrated example, message generation component 172 includes a unique identifier generator 182 that uses an identifier generation algorithm 184 to generate unique identifiers for users of architecture 100. This is discussed in further detail below. In one example, the unique identifiers can be stored in user profiles 151.

As discussed above, in one example, systems 132 and 134 include calendar server(s) and email server(s) configured to perform various email processing and calendaring operations described herein. Although illustrated as separate components in FIG. 1, the calendar and email servers can be the same server or set of servers. A user may utilize a same account for managing both email and calendar data.

In the illustrated example of FIG. 1, architecture 100 generates and associates a unique identifier for each record 150 that identifies the owner of the record. In one example, record generation component 154 receives a record generation request that includes a set of attributes and generates a record 150 based on the request. For instance, an event record includes a set of attributes that define an event, such as a set of invitees. This set of attributes is stored in record 150 along with a unique identifier that uniquely identifies the user as the owner of the record. This unique identifier is utilized by component 160 to control and provide security with respect to subsequent event messages to prevent non-owner users from taking ownership of the record incorrectly, thereby hijacking the event record from the actual owner.

In one example, which is discussed in further detail below, the unique identifier can be provided as a property that is added to an email transport header of the event messages. The unique property is, in one example, a protected property which cannot be spoofed. Spoofing refers to a practice of forging source address and/or related message information to misrepresent an email identity. By changing the information, an individual can make an email message appear to originate from a trusted source when it in fact originates elsewhere.

Figure 3:
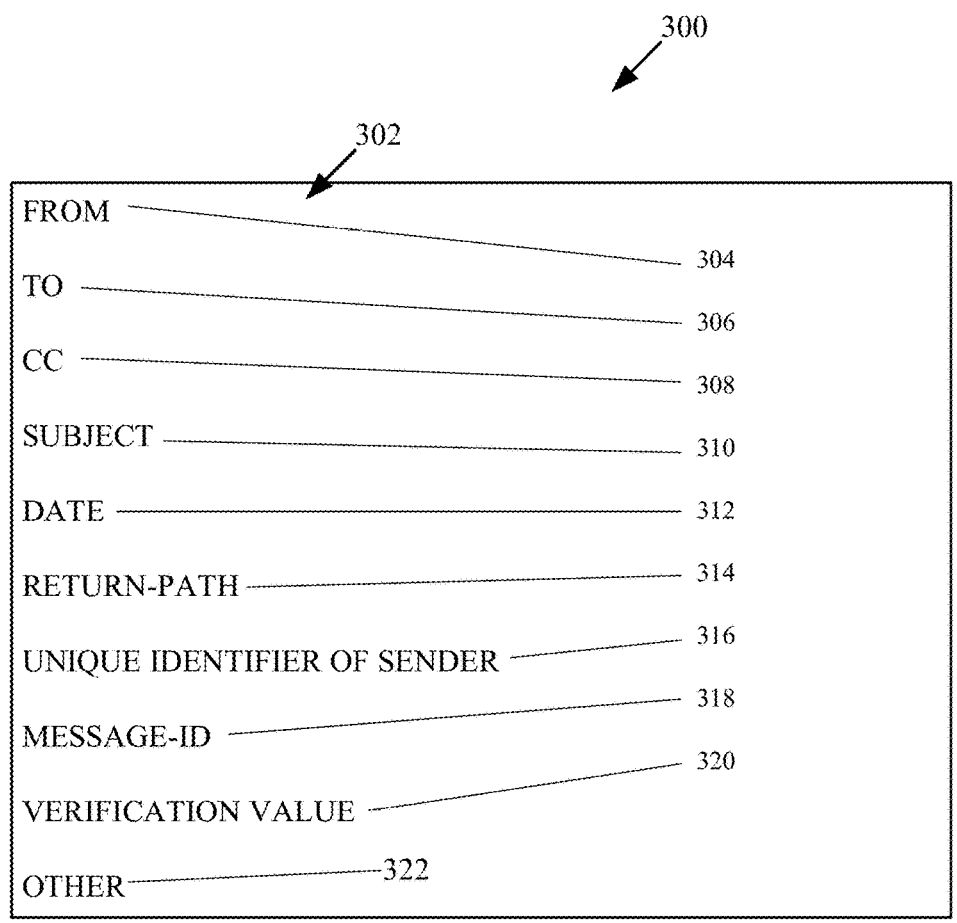
FIG. 3 illustrates one example of an email header having a set of fields.

FIG. 3 illustrates one example of an email header 300 having a set of fields 302. In one example, header 300 can be stored as a row in a header table, where the row includes a variety of information about the message in an account corresponding to a particular user. In the illustrated example, some or all fields 302 are controlled by the sending email server such that they cannot be set or spoofed by client devices 110, 112, and/or 114. That is, if client device 110, under the control of user 104, attempts to set the fields in header 300, message generation component 172 will overwrite these fields when sending messages to the associated users.

In the illustrated example, fields 302 includes a from field 304, a to field 306, a cc field 308, a subject field 310, a date field 312, a return path field 314, a unique identifier field 316, a message ID field 318, a verification value field 320, and can include other fields 322 as well. For sake of illustration, the from field 304 identifies the email address of the sender, the to field identifies the email address of the recipient, and the cc field identifies email addresses of any users that are "carbon copied" on the email. Subject field 310 includes the subject of the email, date field 312 includes a date when the email was sent, the return path field 314 identifies the path for sending a return email, and message ID field 318 provides a unique identifier for the message. In one example, message ID field 318 includes a system time and/or a sequence number.

Unique identifier field 316 comprises the unique identifier for the user for which the email is being sent. Field 316 thus comprises data obtained and stamped by the email server and is outside the control of an email sender who may be engaged in spoofing. Thus, even if a recipient of an email is able to view the transport header and identify the unique identifier in field 316, the recipient cannot use the unique identifier to hijack the meeting record because the recipient's email server will override this field of the email if the recipient attempts to spoof the unique identifier in a record hijack attempt.

In one example, the unique identifier comprises or is based in part on the user's email address (or ID). In another example, the unique identifier is different than and/or generated independent from the user's email address.

A user's email address may change over time, in some scenarios. For instance, a user of an organization may be given a new alias, for example if the user's name changes or they are given a different position. Further, email addresses are generally known by others and could be a target during a meeting hijack attempt. In one example, unique identifier generator 182 uses algorithm 184 to generate a unique identifier for the user that is immutable with respect to the user. As such, even if the user's mailbox 176 is moved or the user is assigned a new email address (e.g., the user's alias changes), the unique identifier of the user does not change.

In one particular example, the unique identifier generated by unique identifier generator 182 for user 104 is based on a unique identifier of the mailbox 176 assigned to user 104. For instance, a mailbox globally unique identifier (GUID) can be used. The mailbox GUID comprises a value set in computing system 102 when the mailbox is created, and remains the same for the lifetime of the mailbox. In other words, the mailbox GUID comprises a primary key for the mailbox, and is a unique value that distinguishes the individual mailbox from all other mailboxes. Alternatively, or in addition, the unique identifier generated by unique identifier generator 182 can be based on a unique object distinguished name that is defined when the mailbox is created.

In one particular example, the unique identifier comprises a plurality of attributes that have mutually exclusive situations in which the attributes can change. For instance, the unique identifier can comprise a combination of a first attribute (e.g., mailbox GUID) and a second attribute (e.g., unique object distinguished name that is assigned to the mailbox). As such, even if one of the attributes changes over time, the other attribute will not, thus resulting in the unique identifier remaining immutable with respect to the user.

These, of course, are examples of identifier generation algorithm 184. Any suitable unique identifiers can be utilized.

Referring again to FIG. 1, architecture 100 includes a verification component that is configured to ensure that the unique identifier of the sender in field 316 is valid and has not been modified prior to being received. For instance, the verification component is configured to detect if a user or system attempts to tamper with the unique identifier in field 316. For example, but not by limitation, the verification component can use encryption, a hash function, and/or check sum generation that uses a check sum function or algorithm that is known to the sending and receiving email servers.

In the illustrated example, message generation component 172 includes a verification value generator 186 and message processing component 174 includes a verification value analyzer 188. Verification value generator 186 is configured to generate a check sum or hash value based on some or all of the email header. For instance, the verification value can comprise a check sum generated on the unique identifier in field 316 of example email header 300. The verification value can be stored in verification value field 320 shown in FIG. 3.

Verification value analyzer 188 corresponds to generator 186 and is configured to determine whether the verification value in field 320 is valid and indicates that the unique identifier in field 316 is not erroneous and has not been tampered with.

Figure 4:
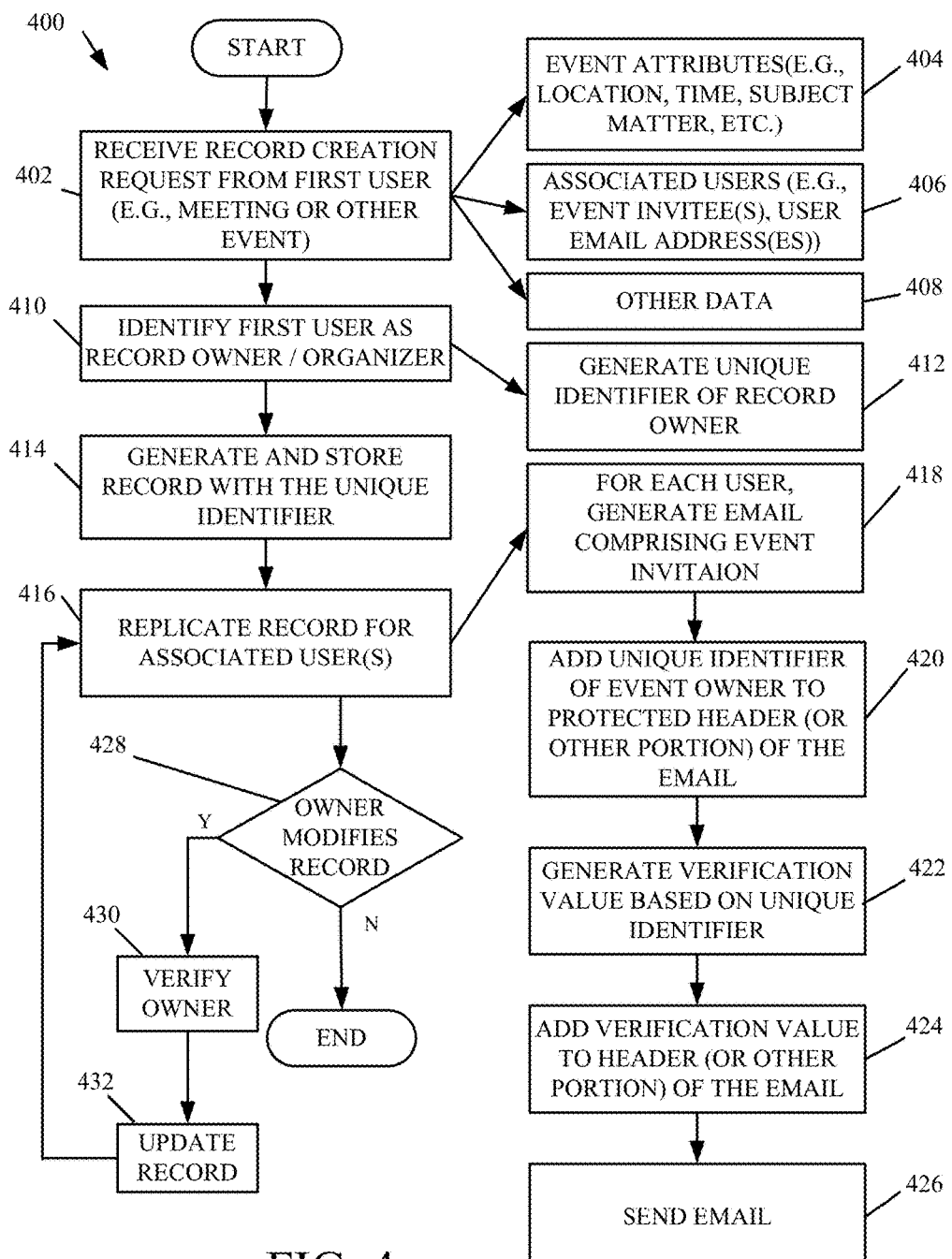
FIG. 4 is a flow diagram illustrating one example of a method for generating a record.

FIG. 4 is a flow diagram illustrating one example of a method 400 for generating a record. For sake of illustration, but not by limitation, method 400 will be described in the context of generating an event record in architecture 100.

At block 402, record generation component 154 receives a record generation request from a first user (e.g., user 104). For example, in the request user 104 identifies email addresses of a set of event invitees (e.g., users 106, 108, and/or users of system(s) 128). The record comprises a meeting or other event having a set of event attributes 404, associated users (e.g., event invitees) 406, and can include other data 408 as well. Examples of event attributes include, but are not limited to, location, time, subject matter/topic information, etc. In one example, the event invitees are identified by their user email addresses selected by the first user in the record generation request.

At block 410, the method identifies the first user as the record owner (e.g., the event organizer) and, at block 412, unique identifier generator 182 generates a unique identifier of the record owner. In one example, the unique identifier is immutable and uniquely identifies the owner user (user 104 in the present example) from among all other users of architecture 100.

At block 414, record generation component 154 generates and stores the record with the event attributes 404 and the unique identifier generated at block 412.

At block 416, record replication component 168 replicates the records for each of the associated users (i.e., event invitees in the present example). In one example, for each invitee user, messaging system controller 170 controls messaging system 134 to generate an email comprising an event invitation for the invitee user. This is represented at block 418. The event invitation can include the event attributes 404 and/or associated users 406. At block 420, the unique identifier generated at block 412 is added to a protected header (or other portion) of the email. A verification value is generated based at least in part on the unique identifier. This is represented at block 422. At block 424, the verification value is added to the header (or other portion) of the email and the email is sent to the invitee user at block 426.

At block 428, the method determines whether the owner modifies the record. For example, the owner may decide to change the location or time of the event, cancel the event, and/or add invitees to the event. For instance, the owner may decide to forward the event to one or more additional users to be invited to the event.

If so, at block 430 the method verifies the owner by comparing the owner identifier to the event record. At block 432, the record is updated and blocks 416-426 can be repeated to replicate the updated record for the other users.

Figures 1, 5:
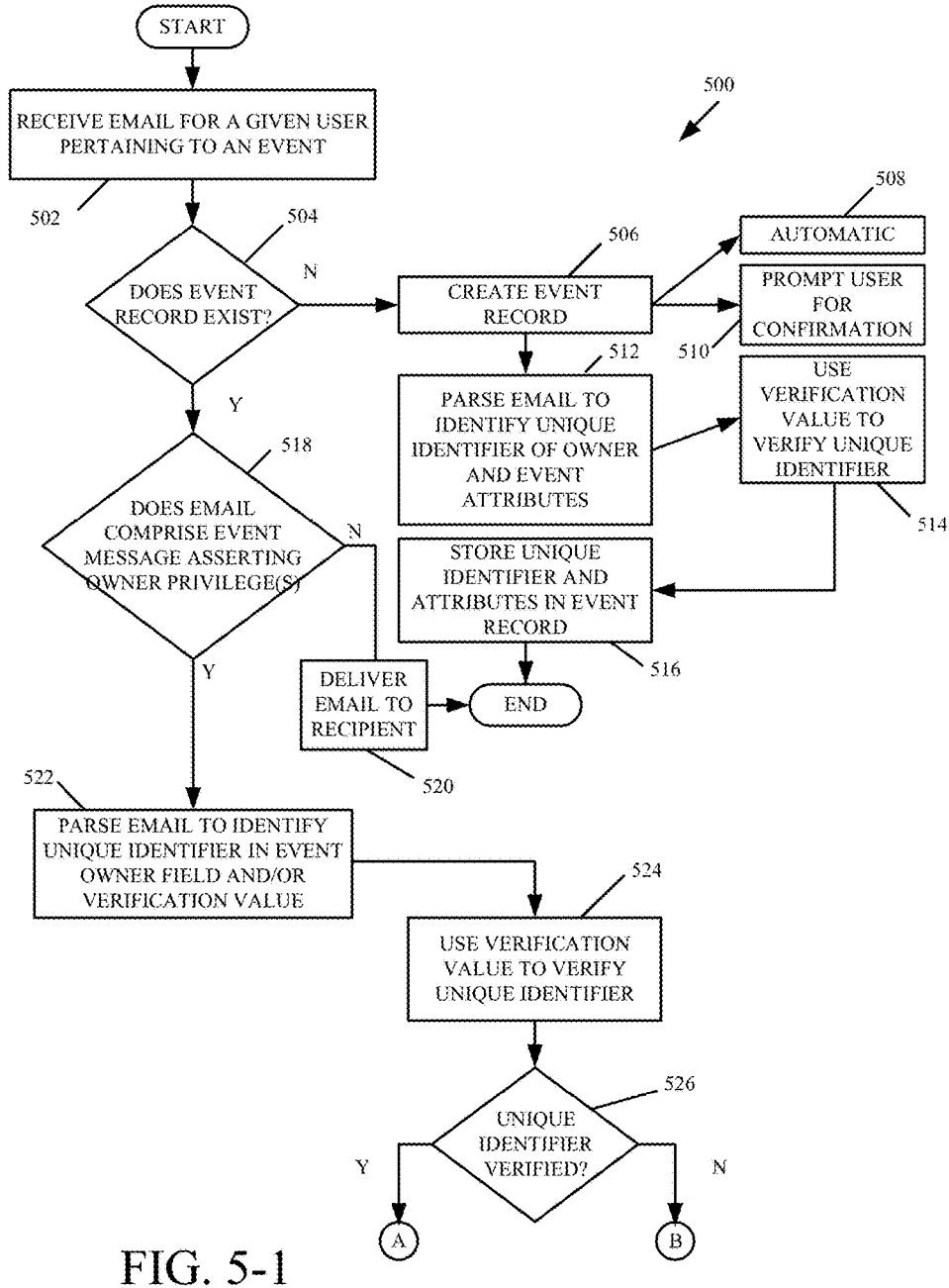
Figures 2, 5:
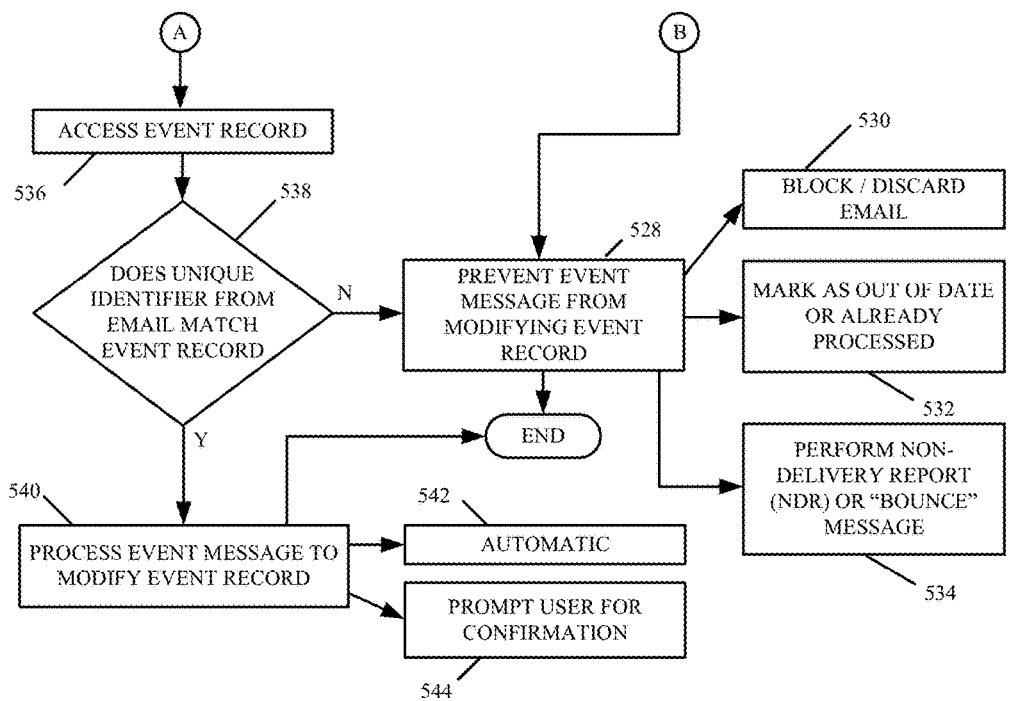

FIGS. 5-1 and 5-2 (collectively referred to as FIG. 5) are a flow diagram of one example of a method 500 for receiving and processing an event message. For sake of illustration, but not by limitation, method 500 will be described in the context of record security component 160 processing an email pertaining to an event in architecture 100.

At block 502, message processing component 174 receives an email (or other message) for a given user pertaining to an event. At block 504, the method determines whether the event record exists. If not, the event record is created in data store 130. This is represented by block 506.

It is noted that the event creation at block 506 can be automatic. This is represented by block 508. Alternatively, the user can be prompted for confirmation of the event record creation. This is represented by block 510. At block 512, message processing component 174 parses the email to identify the unique identifier of the owner and the event attributes. In the example of FIG. 3, the unique identifier is obtained from field 316 which indicates the sender of the email for which the event record is created.

At block 514, the method can use a verification value provided in the email to verify the unique identifier upon which the unique identifier and attributes are stored in the event record. This is represented by block 516.

If the event record does exist at block 504, the method proceeds to block 518 in which the method determines whether the email comprises an event message asserting owner privileges. For instance, in one example the method determines whether the email purports to update the meeting attributes, or to cancel the meeting. If the event message does not assert owner privileges (e.g., it is simply an email message from an invitee with information about the event), the method proceeds to block 520 in which the email is delivered to the recipient.

At block 522, message processing component 174 parses the email to identify the unique identifier of the sender (e.g., field 316 in FIG. 3) and/or a verification value based on the unique identifier (e.g., field 320 in FIG. 3). The method uses the verification value to verify the unique identifier extracted from the email. This is represented by block 524. This verification can validate the unique identifier to ensure that it has not been corrupted or tampered with since the email message was generated from the sending email server.

At block 526, if the unique identifier is not verified, indicating that it is erroneous or corrupted, the method proceeds to block 528 which prevents the event message from modifying the event record. For instance, the email can be blocked or discarded. This is represented by block 530. In another example, the email is marked at out-of-date or already processed to prevent processing of the message against the event record. This is represented by block 532. Alternatively, or in addition, a non-delivery report (NDR) or "bounce" message can be sent to the sender of the email to indicate that it has not been processed at the recipient end. This is represented by block 534.

If the unique identifier is verified, the method proceeds to block 536 in which the event record is accessed. For example, the email received at block 502 can include a meeting identifier that is matched against a meeting ID field 218 for the corresponding record.

At block 538, the method determines whether the unique identifier extracted at block 522 corresponds to (e.g., matches) the unique identifier of the owner from the event record. If not, the method proceeds to block 528 to prevent the event message from modifying the event record.

If the unique identifier from the email corresponds to the event record, the method proceeds to block 540 in which the event message is processed to modify the event record. This can be done automatically, which is represented by block 542. Alternatively, or in addition, the recipient user can be prompted for confirmation as to whether the event message should be processed against the user's event record. This is represented by block 544.

Referring again to FIG. 1, in the illustrated example system 134 includes a record ownership transfer component 190 configured to facilitate transfer of record ownership within architecture 100. Component 190 includes a messaging system controller 192, a display system controller 194, and an ownership discrepancy identification and correction component 196. Messaging system controller 192 is configured to control messaging system 134, which is discussed in further detail below. Display system controller 194 is configured to control display system 136 to generate and render user interface displays that receive user inputs to perform a record ownership transfer. Component 190 can include other items 198 as well.

By way of example, transfer of record ownership is desired in a variety of different scenarios. For instance, a user who owns a record 150 may leave an organization or change teams within the organization, or may be absent for an extended period of time. In the case of a calendar event, the other event invitees may still conduct the meeting without the owner who originally organized the event. Further, the other event invitees may desire to change the date or time, or add additional invitees to the event, even though the owner is not available to modify the record. Record ownership transfer component 190 facilitates transfer of record ownership within security architecture 100. Record ownership can be transfer from the record owner to a user who is currently associated with the record (e.g., a meeting invitee), as well as to a user who is not currently associated with the record (e.g., a user other than a meeting invitee).

In one example, an administrator can use record ownership transfer component 190 to access the record 150 and directly change the owner property. This can be done in any of a variety of ways including, but not limited to, a script or other code that is executed at the direction of the administrator. In another example, record ownership transfer can be initiated and performed by the record owner using component 190.

Figures 1, 6:
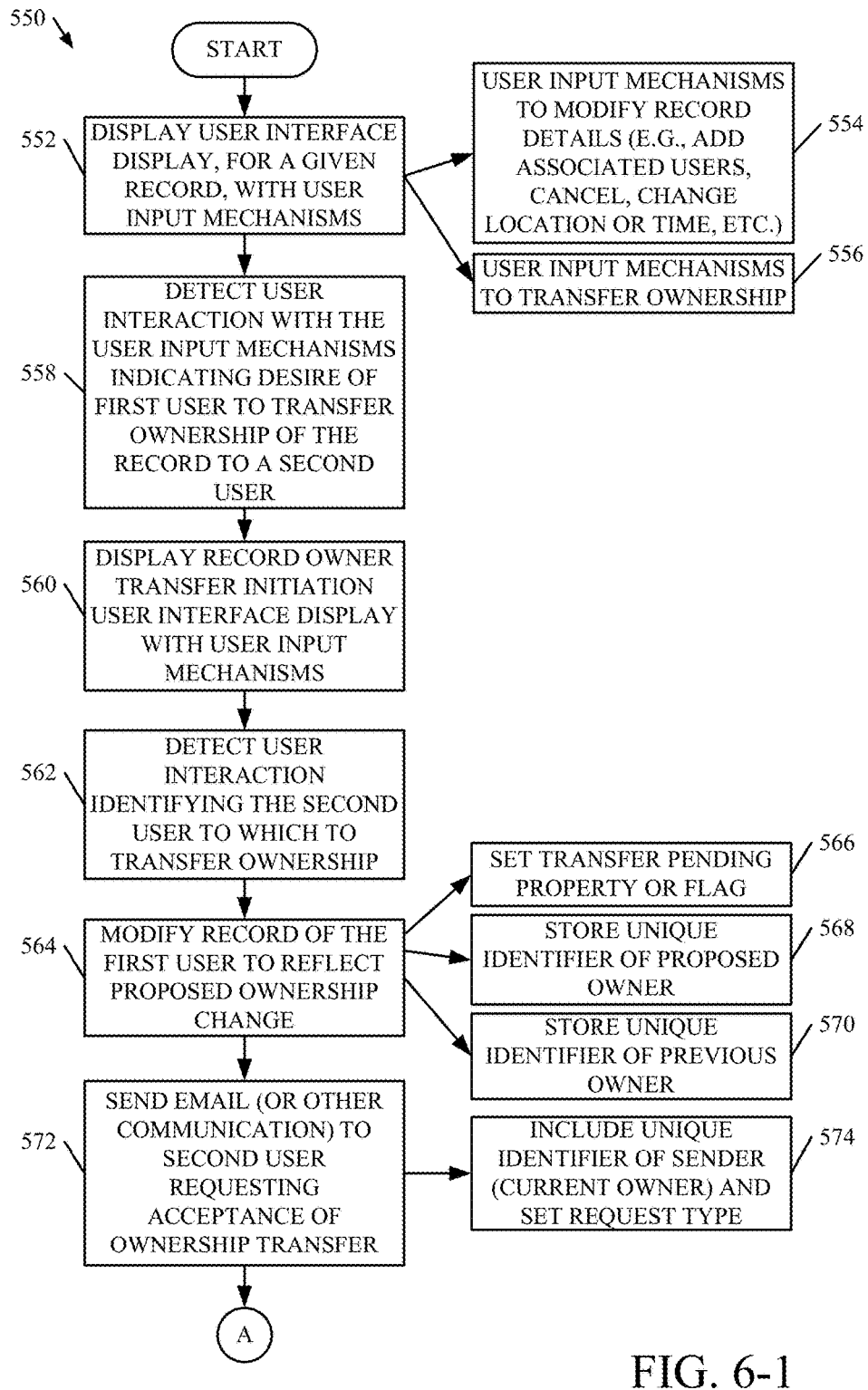
Figures 2, 6:
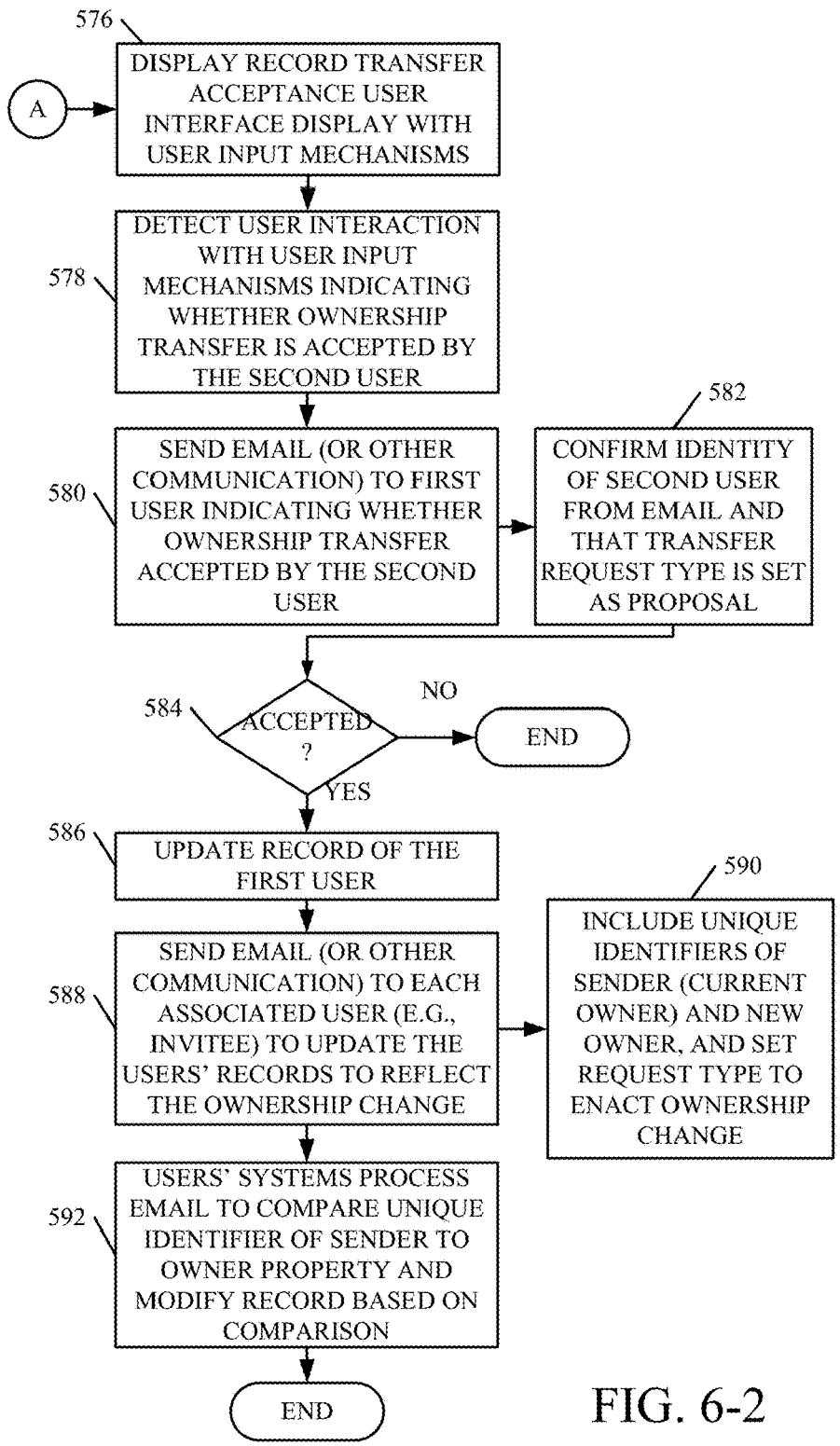

FIGS. 6-1 and 6-2 (collectively referred to as FIG. 6) is a flow diagram of one example of a method 550 for transferring ownership of a record. For sake of illustration, but not by limitation, method 550 will be described in the context of transferring an event record using component 190 in architecture 100.

At block 552, a user interface display is generated for a first user, for a given record, with user input mechanisms. The user input mechanisms can comprise mechanisms for modifying details of the record. This is represented by block 554. For instance, in the case of a calendar event record, the user input mechanisms facilitate adding associated users or event invitees, cancelling the event, changing a location or time of the event, etc. The user input mechanisms also include user input mechanisms to transfer ownership of the given record. This is represented by block 556.

Figure 7:
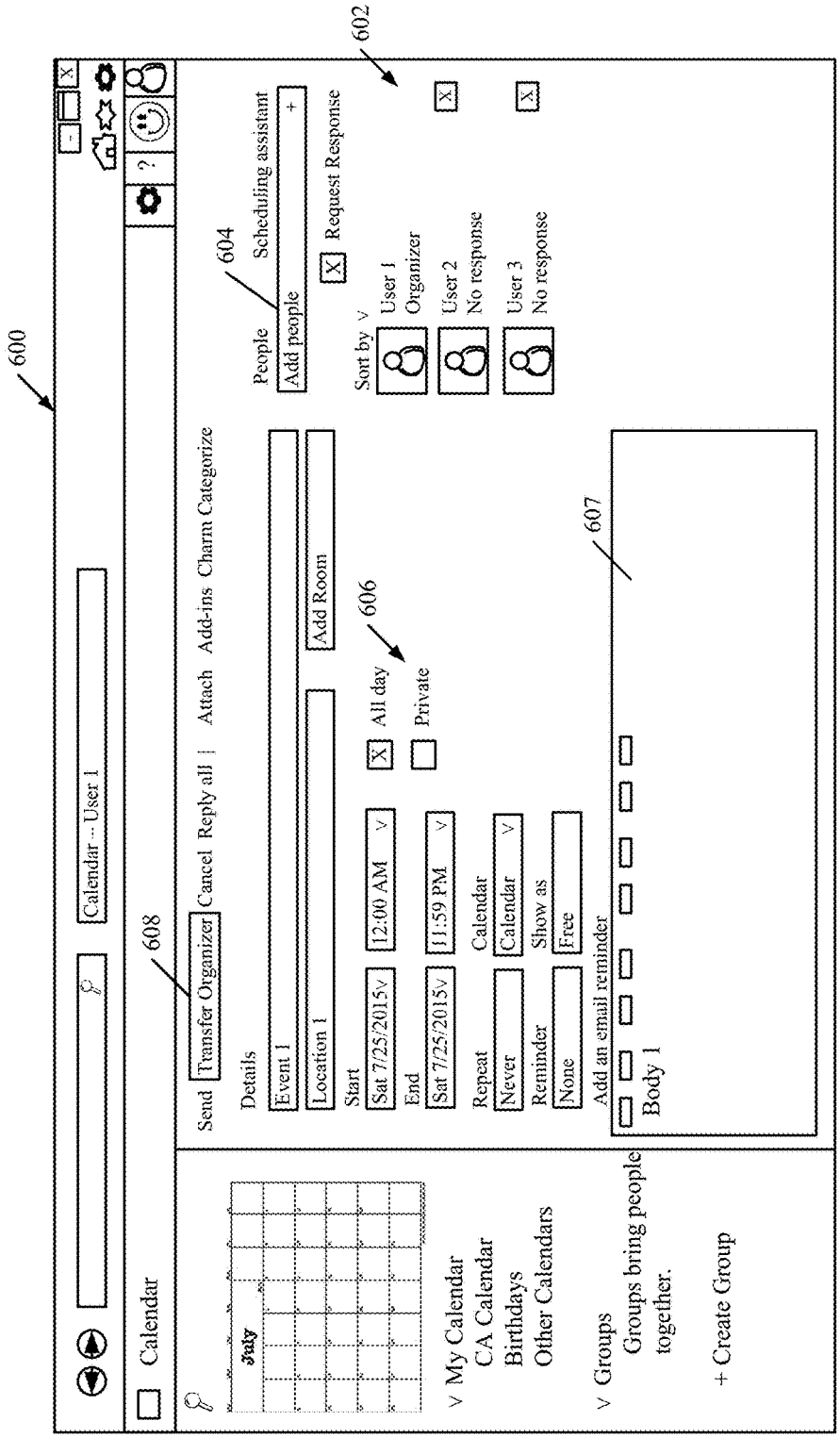
FIG. 7 illustrates one example of a user interface display for a calendar event record.

FIG. 7 illustrates one example of a user interface display 600 for a calendar event record. User interface display 600 includes a plurality of editable fields 602 for editing details of the record. For example, fields 602 includes a people field 604 for adding invitees to the calendar event, date/time fields 606 for setting a date and time of the event and a message field 607 for authoring a message to the invitees. User interface display 600 also includes a transfer ownership user input mechanism 608 that is actuatable to initiate a transfer of ownership.

Referring again to FIG. 6, at block 558 a user interaction with the user input mechanisms is detected indicating a desire of the first user to transfer ownership of the record to a second user. For instance, in the example of FIG. 7 block 558 detects user actuation of user input mechanism 608 and confirms that the first user, who is using user interface display 600, is actually the owner of the given record. This can be done by accessing the owner property stored on the event record.

Figure 8:
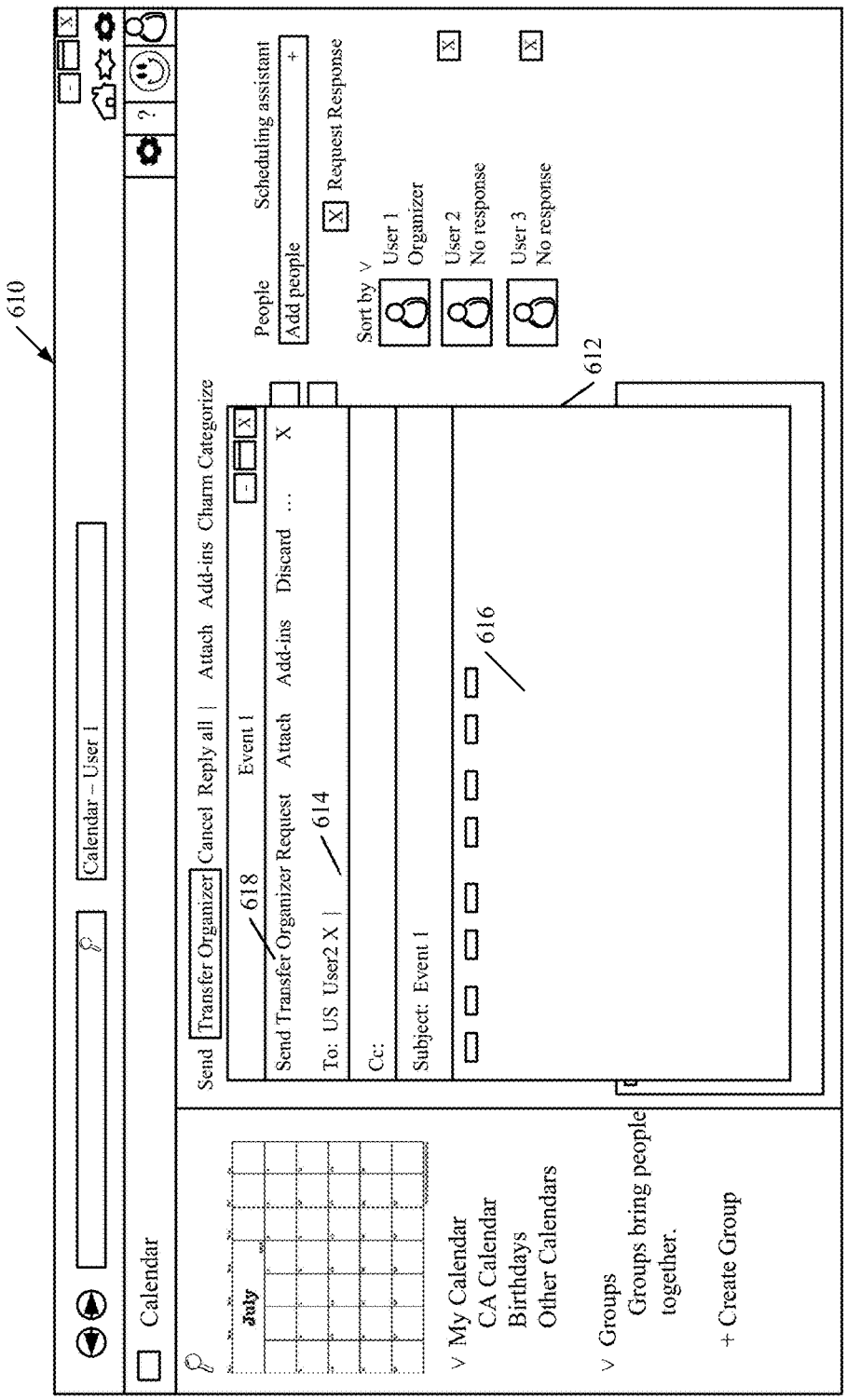
FIG. 8 illustrates one example of a record owner transfer initiation user interface display.

At block 560, a record owner transfer initiation user interface display is generated with user input mechanisms. FIG. 8 illustrates one example of a user interface display 610 that is displayed at block 560. User interface display 610 includes a display portion or window 612 that includes a recipient field 614 for receiving an identification of the user to which ownership transfer is being proposed. In the present example, the ownership transfer request is sent to the second user as an email (or other communication). In this manner, a recipient field 614 receives an email address, or other identifier, of the second user. Display window 612 also includes a message portion 616 for receiving a textual message (or other content) to be sent to the second user and a user input mechanism 618 for sending the transfer request.

Referring again to FIG. 6, at block 562, method 550 detects a user interaction (e.g., with field 614 in FIG. 8) that identifies the second user to which record ownership is to be transferred. At block 564, the record of the first user is modified to reflect the proposed ownership change. This can include setting a transfer pending property or flag (represented by block 566), storing the unique identifier of the proposed owner (represented by block 568), and/or storing a unique identifier of the previous owner (represented by block 570).

FIG. 9 illustrates a set of record properties 620 used to store the information at block 564, in one example. Properties 620 includes a proposed owner property 622, an owner transfer pending property or flag 624, and a previous owner property 626. The proposed owner property 622 stores a unique identifier of the proposed owner (i.e., the second user in the example of FIG. 6) and the previous owner property 626 stores the unique identifier of the previous owner of the record (i.e., the first user in the present example) from which the ownership is being transferred. The owner transfer pending property 624 indicates whether an ownership transfer is pending for the record. That is, property 624 can comprise a Boolean value that is set to "true" to indicate that the current owner has initiated an ownership transfer of the record to another user. As discussed in further detail below, property 624 can be subsequently used when a response to the request is received from the proposed owner to verify that the current owner has, in fact, initiated the ownership transfer.

Referring again to FIG. 6, at block 572, an email (or other communication) is sent to the second user requesting acceptance of the ownership transfer. In one example, the email includes the unique identifier of the sender and a request type that is set to indicate that the ownership transfer is in a "proposal" state. This is represented by block 574.

FIG. 10 illustrates one example of the set of properties 630 that are included in an ownership transfer request email sent at block 572. The set of properties 630 can be stored, in one example, in a header of the email. Of course, the set of properties 630 can be stored and sent in another ways as well.

The set of properties 630 includes a proposed owner property 632 that includes a unique identifier of the user to which the ownership transfer is proposed, and an ownership transfer request type property 634. Property 634 indicates the current status of the ownership transfer, and is used by the recipient's system to facilitate a response to the sender. In the present example, at block 572, property 634 is set as "proposal" to indicate that the proposed owner identified by property 632 is the proposed owner and the message requires a response to accept or decline the proposed ownership transfer.

Figure 11:
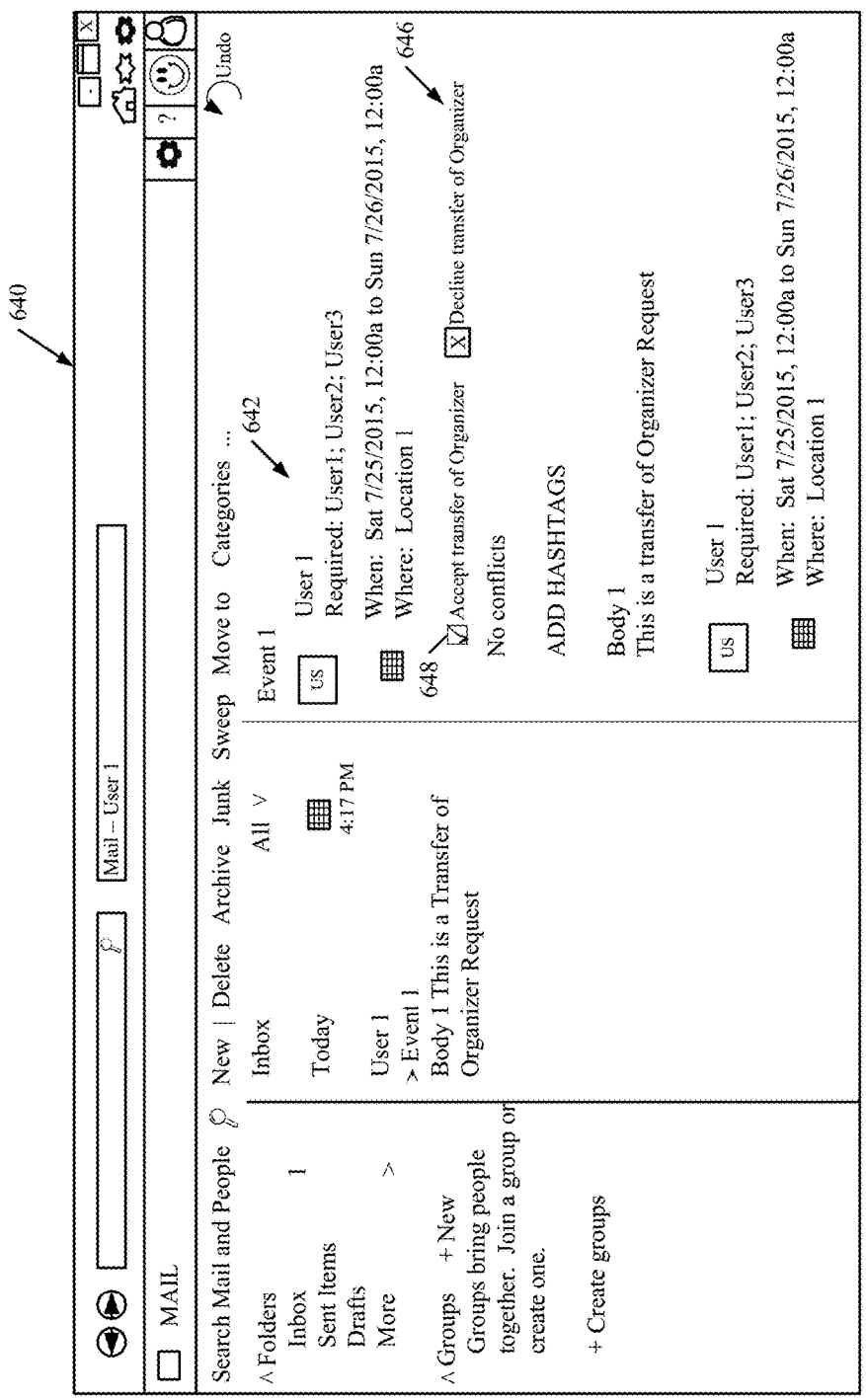
FIG. 11 illustrates one example of a record transfer acceptance user interface display.

Referring again to FIG. 6, at block 576, a record transfer acceptance user interface display is generated with user input mechanisms. FIG. 11 illustrates one example of a user interface display 640 that can be displayed at block 576. User interface display 640 includes a display portion 642 that identifies details of the record, as well as user input mechanisms 646 for the proposed owner to accept or decline the transfer of ownership.

Referring again to FIG. 6, at block 578, a user interaction with the user input mechanisms is detected indicating whether ownership transfer is accepted by the proposed owner. For instance, the second user can select user input mechanism 648, shown in FIG. 11, to accept the ownership transfer. In response, an email (or other communication) is sent to the first user indicating whether the ownership transfer is accepted or declined by the proposed owner. This is represented by block 580.

At block 582, the system of the first user receives the email sent at block 580, and confirms that the email is received from the second user and that the transfer request type is set such that it indicates that an ownership transfer is pending. In the example of FIG. 9, block 582 confirms that the sender of the email from block 580 matches the proposed owner property 622 and the ownership transfer pending property 624 is set to "true", thereby indicating that the current owner has in fact initiated the ownership transfer. As such, this can prevent a non-owner user from unilaterally initiating and performing an ownership transfer of a record without knowledge of or input by actual current owner of the record.

If the ownership transfer is accepted at block 584, the method proceeds to block 586 in which the record of the first user is updated. In one example, this includes setting the owner property 212 in the example of FIG. 2, to indicate the second user as the new owner of the record and changing the owner transfer pending property 624 to indicate that an ownership transfer is no longer pending. At block 588, an email (or other communication) is sent to each of the associated users (i.e., the event invitees) to update those user's records as well, to reflect the ownership change.

In one example, the email sent at block 588 includes the set of properties 630, with the new owner (i.e., the second user) identified by property 632 and the ownership transfer request type property 634 set as "enacting", to distinguish the message from the initial ownership transfer message sent at block 572. This is represented by block 590.

At block 592, the associated users' system(s) process the email sent at block 588 to compare the unique identifier of the sender to the current owner property to verify that the transfer request came from the current owner of the record (i.e., the first user in the present example). In response to this comparison, the users' system(s) modify the record to change to owner property to reflect the new user as the record owner.

It is noted that in another example of method 550, the ownership transfer can be initiated by the non-owner second user. That is, in this example method 550 begins at block 580 in which the second user indicates a desire to take ownership of the record, upon which the second user's system sends an email (or other communication) to the first user requesting that the first user transfer record ownership to the second user.

Referring again to FIG. 1, ownership discrepancy identification and correction component 196 is configured to identify discrepancies in record ownership between the associated users. By way of example, in one scenario the email sent at block 588 may fail for some or all of the event invitees, resulting in a failure of the records of those invitee(s) to update to reflect the new record owner. In other words, the records for some invitee users may properly indicate the second user as the owner of the record, while the records of other invitees may continue to improperly list the first user as still being the owner of the record. Component 196 is configured to analyze or otherwise access the records of each user and to correct a discrepancy in record ownership. In one example, component 196 is configured to roll back the owner property using the previous owner property 626 illustrated in the example of FIG. 9.

Figure 12:
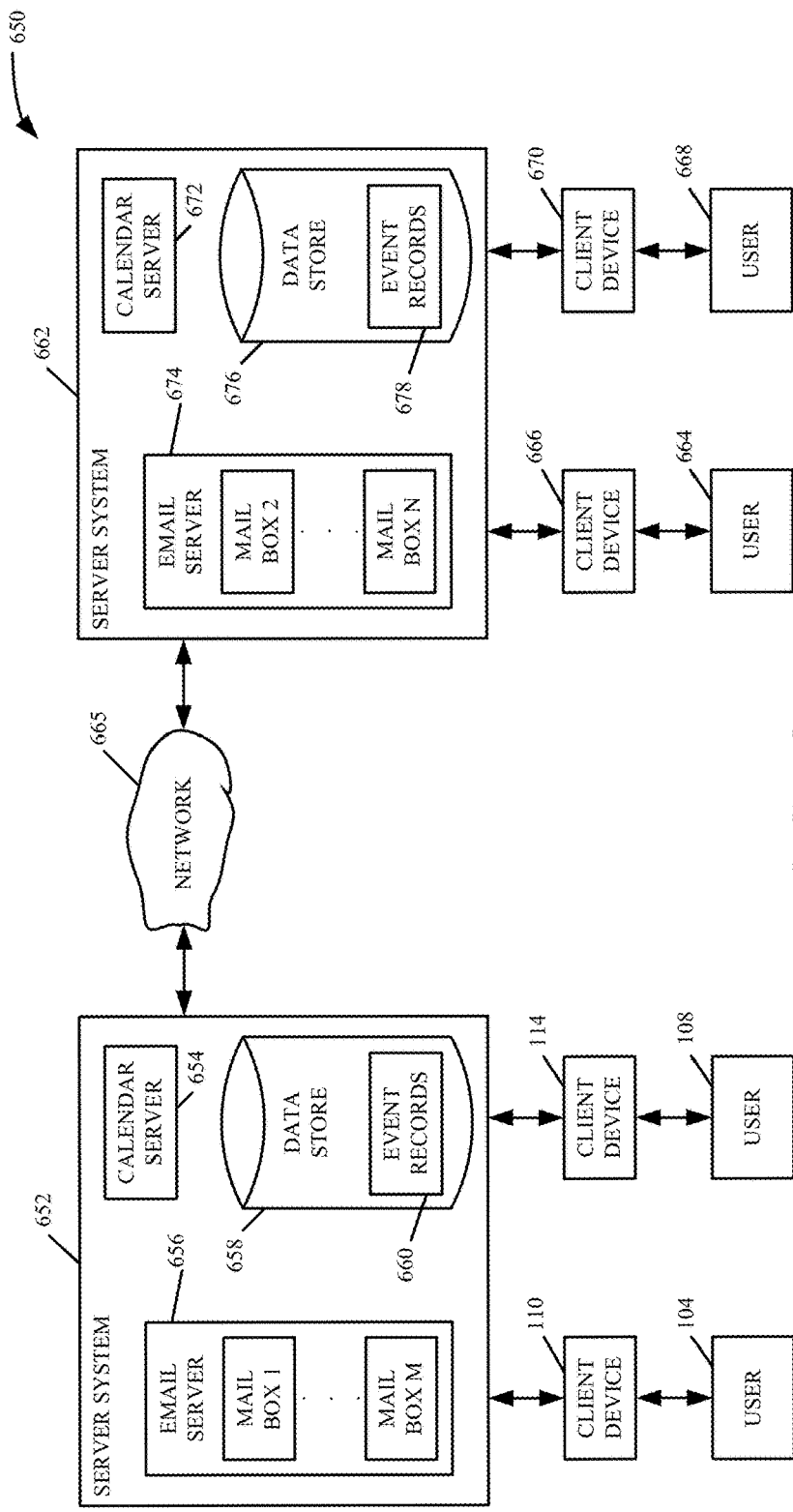
FIG. 12 is a block diagram of one example of an architecture in which users utilize different server systems.

FIG. 12 is a block diagram of one example of an architecture 650 in which users utilize different server systems. For example, user 104 uses client device 110 and user 108 uses client device 114 to access a server system 652. Server system 652 includes a calendar server 654 and an email server 656 which are, in one example, similar to systems 132 and 134 discussed above with respect to FIG. 1. A data store 658 stores event records 660 for users 104 and 108.

Server system 652 communicates with a server system 662 over a network 665, such as the Internet. Server system 662 is accessed by a user 664 using a client device 666 and user 668 using a client device 670. Server system 662 includes a calendar server 672 and an email server 674 which are, in one example, similar to systems 132 and 134 discussed above with respect to FIG. 1. A data store 676 stores event records 678 for users 664 and 668.

It can thus be seen that the present discussion provides significant technical advantages. For example, it provides a record security architecture that securely manages and controls record generation and modification to enforce ownership privileges over the records. The security architecture provides protection to prevent users from taking ownership of the records incorrectly, thereby hijacking the records to assert ownership privileges to which the users should not have access to. The architecture prevents users from being incorrectly recognized as the event organizer, or record owner, and validates meeting messages to prevent the messages from being processed against the event records if the meeting message is not coming from a legitimate owner of the record. This keeps the records secure while reducing or preventing inadvertent data loss, for example by preventing meetings from being erroneously cancelled or modified. Further yet, the architecture provides a framework to protect the transmission of the unique identifiers to prevent the identifier from being spoofed.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, et cetera. They can also be actuated in a wide variety of different ways. For instance, they can be actuated using a point and click device (such as a track ball or mouse). They can be actuated using hardware buttons, switches, a joystick or keyboard, thumb switches or thumb pads, et cetera. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 13:
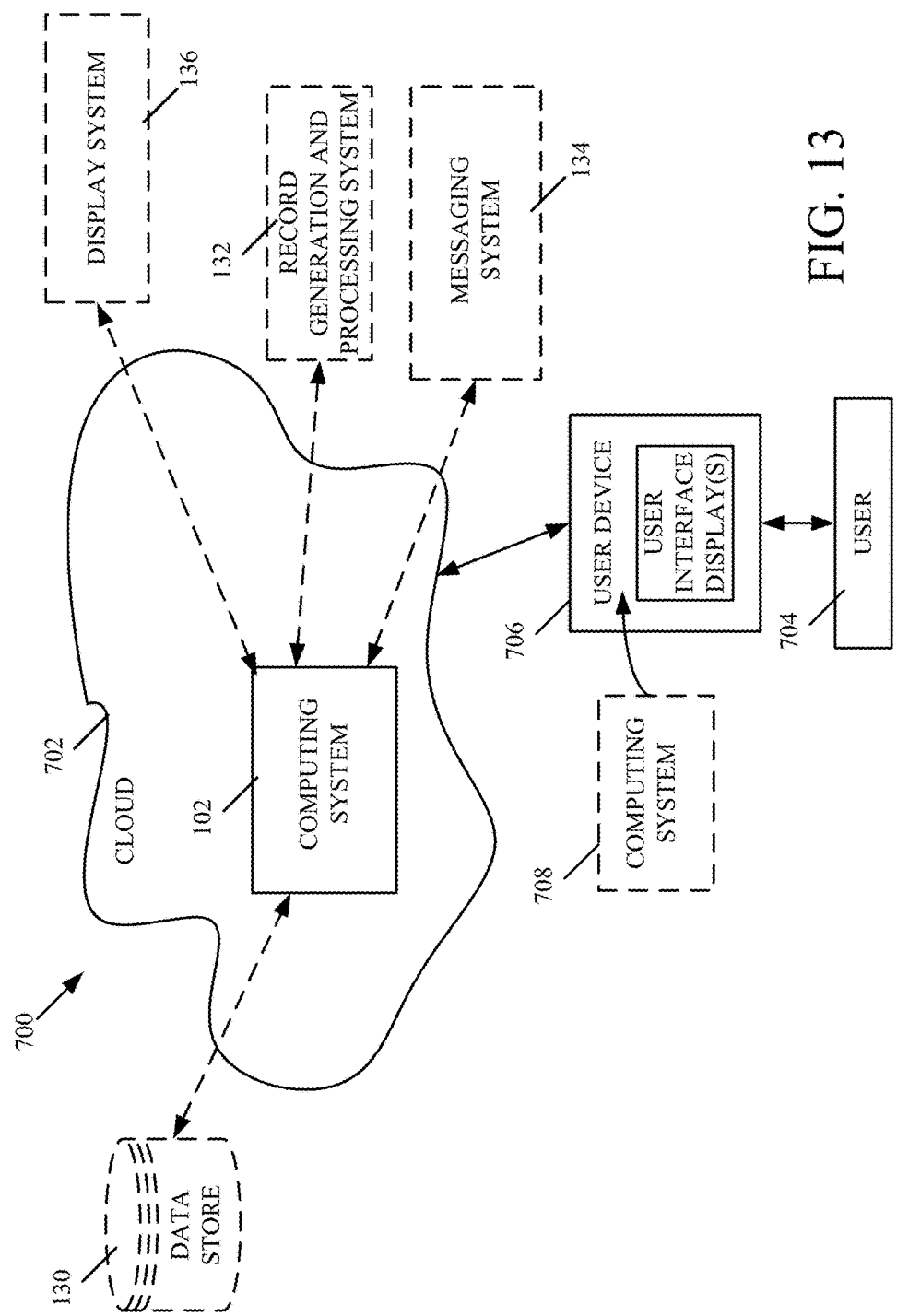
FIG. 13 is a block diagram showing one example of the architecture illustrated in FIG. 1, deployed in a cloud computing architecture.

FIG. 13 is a block diagram of a cloud computing architecture 700. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, et cetera.

In the embodiment shown in FIG. 13, some items are similar to those shown in FIG. 1 and they are similarly numbered. FIG. 13 specifically shows that some or all components of architecture 100 are located in cloud 702 (which can be public, private, or a combination where portions are public while others are private). Therefore, user 704 (e.g., users 104, 106, and/or 108) uses a user device 706 (e.g., client devices 110, 112, and/or 114) to access those components through cloud 702.

FIG. 13 also depicts another embodiment of a cloud architecture. FIG. 13 shows that it is also contemplated that some elements of architecture 100 are disposed in cloud 702 while others are not. In one example, data store 130 can be disposed outside of cloud 702, and accessed through cloud 702. In another example, record generation and processing system 132 can be disposed outside of cloud 702, and accessed through cloud 702. In another example, messaging system 134 can be disposed outside of cloud 702, and accessed through cloud 702. In another example, display system 136 can be disposed outside of cloud 702, and accessed through cloud 702. In another example, at least some components of computing system 102 can be disposed on user device 706. This is represented by block 708. Regardless of where they are located, the elements of architecture 100 can be accessed directly by device 706, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, et cetera.

Figure 14:
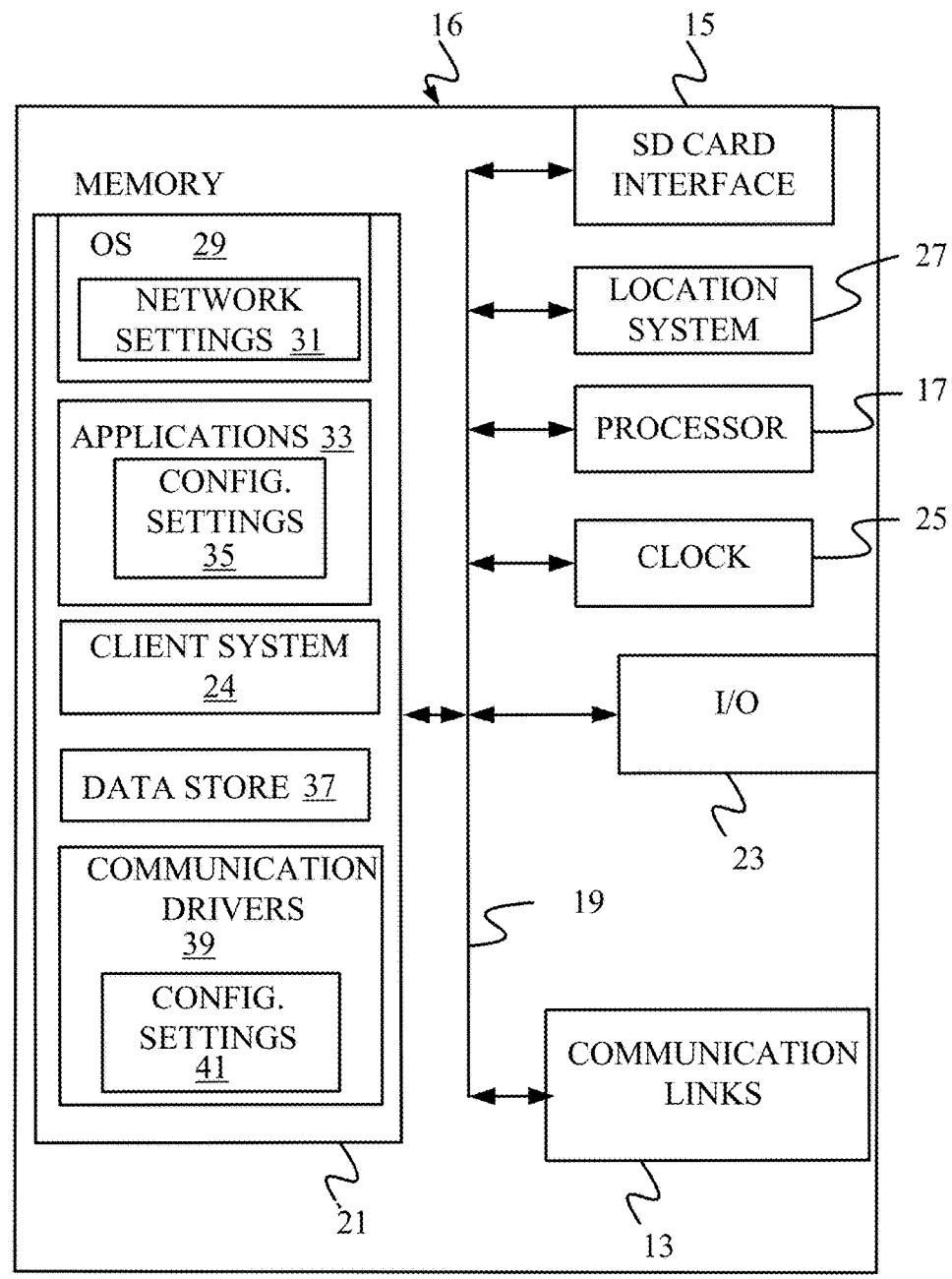
FIGS. 14-16 show various examples of mobile devices that can be used with the architecture shown in FIG. 1.
Figure 15:
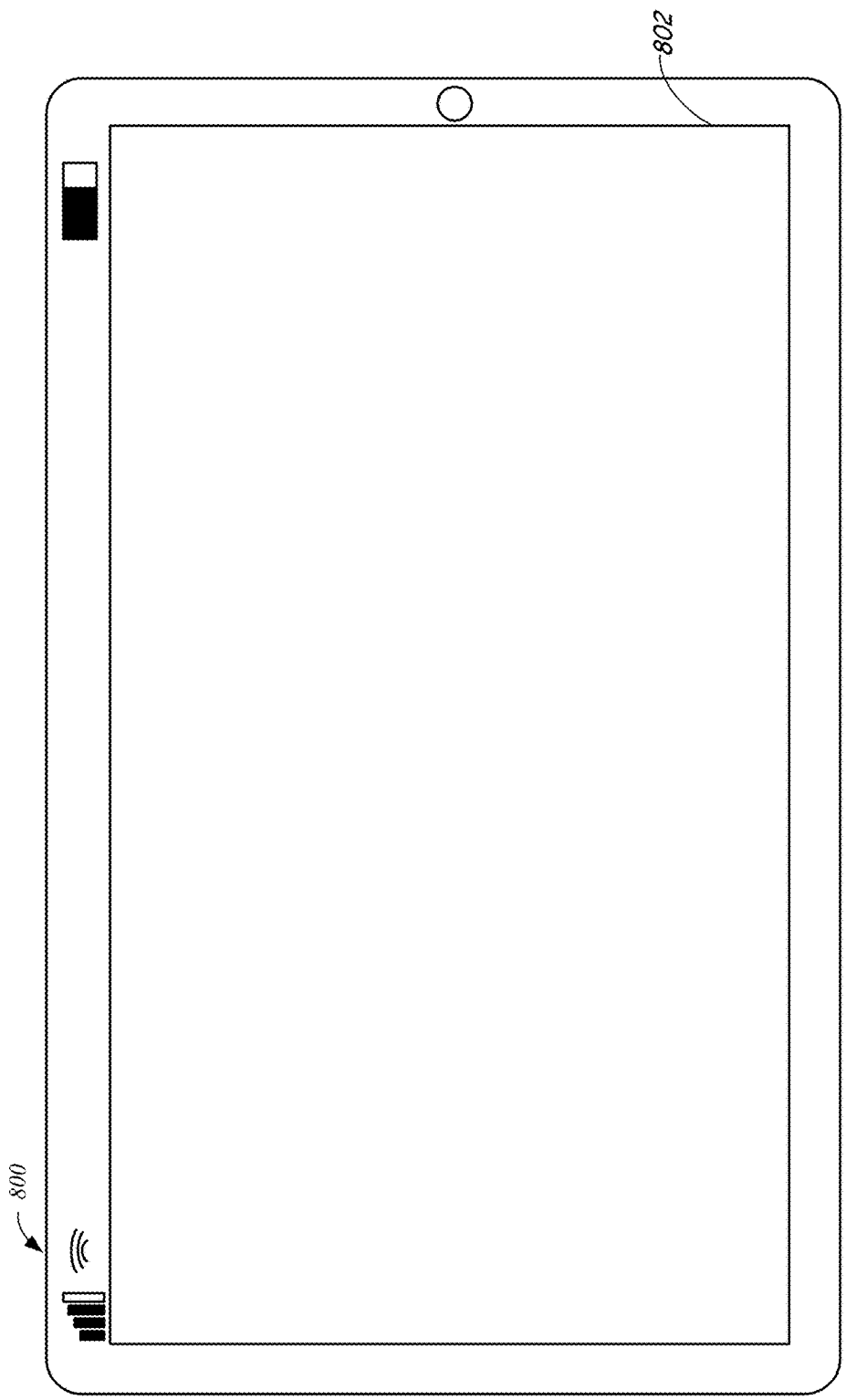
Figure 16:
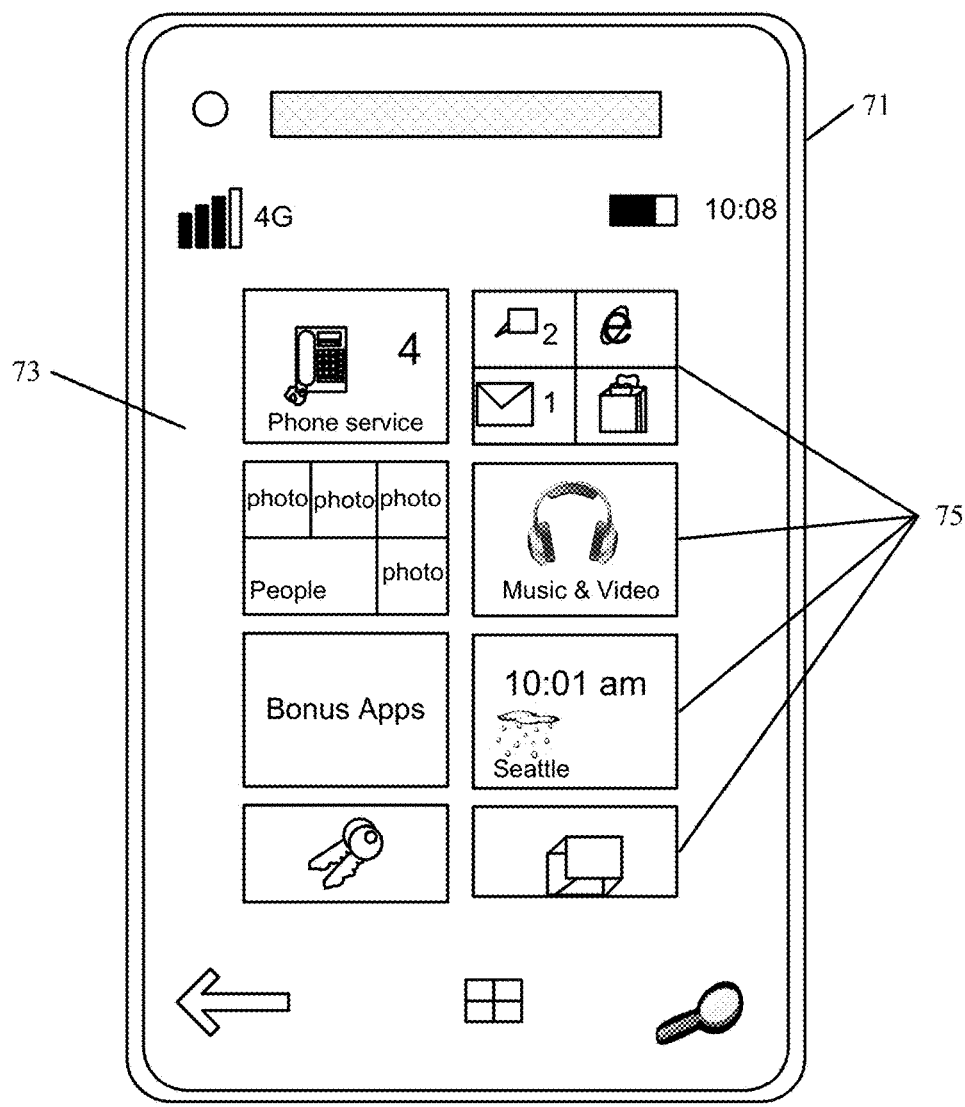

FIG. 14 is a simplified block diagram of one illustrative embodiment of a handheld or mobile computing device that can be used as a user's or client's hand held device 16, in which the present system (or parts of it) can be deployed. FIGS. 15-16 are examples of handheld or mobile devices.

FIG. 14 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Items in data store 128, for example, can reside in memory 21. Similarly, device 16 can have a client system 24 which can run various business applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 15 shows one embodiment in which device 16 is a tablet computer 800. In FIG. 15, computer 800 is shown with user interface display displayed on the display screen 802. Screen 802 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 800 can also illustratively receive voice inputs as well.

Additional examples of devices 16 can be used, as well. Device 16 can be a feature phone, smart phone or mobile phone. The phone includes a set of keypads for dialing phone numbers, a display capable of displaying images including application images, icons, web pages, photographs, and video, and control buttons for selecting items shown on the display. The phone includes an antenna for receiving cellular phone signals such as General Packet Radio Service (GPRS) and 1×rtt, and Short Message Service (SMS) signals. In some embodiments, phone also includes a Secure Digital (SD) card slot that accepts a SD card.

The mobile device can be personal digital assistant (PDA) or a multimedia player or a tablet computing device, et cetera (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA also includes a number of user input keys or buttons which allow the user to scroll through menu options or other display options which are displayed on the display, and allow the user to change applications or select user input functions, without contacting the display. Although not shown, The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device also includes a SD card slot that accepts a SD card.

FIG. 16 shows that the phone is a smart phone 71. Smart phone 71 has a touch sensitive display 73 that displays icons or tiles or other user input mechanisms 75. Mechanisms 75 can be used by a user to run applications, make calls, perform data transfer operations, et cetera. In general, smart phone 71 is built on a mobile operating system and offers more advanced computing capability and connectivity than a feature phone.

Note that other forms of the devices 16 are possible.

Figure 17:
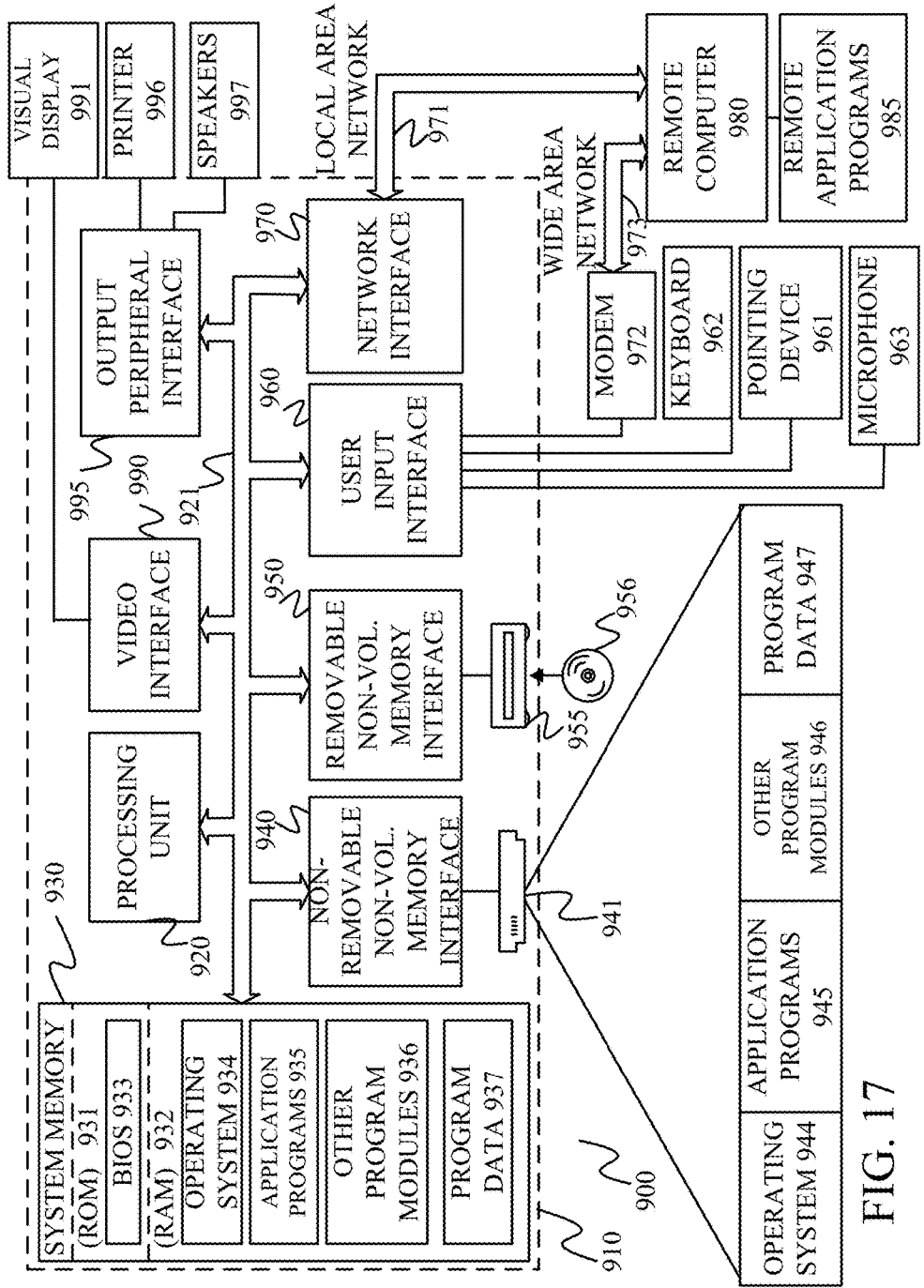
FIG. 17 is a block diagram of one example computing environment.

FIG. 17 is one embodiment of a computing environment in which architecture 100, or parts of it, (for example) can be deployed. With reference to FIG. 17, an exemplary system for implementing some embodiments includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 17.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 17 illustrates operating system 934, application programs 935, other program modules 936, and program data 937.

The computer 910 may also include other removable/non-removable volatile/nonvolatile computer storage media. By way of example only, FIG. 17 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), et cetera.

The drives and their associated computer storage media discussed above and illustrated in FIG. 17, provide storage of computer readable instructions, data structures, program modules and other data for the computer 910. In FIG. 17, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections to one or more remote computers, such as a remote computer 980. The remote computer 980 may be a personal computer, a hand-held device, a server, a router, a network PC, a peer device or other common network node, and typically includes many or all of the elements described above relative to the computer 910. The logical connections depicted in FIG. 17 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 17 illustrates remote application programs 985 as residing on remote computer 980. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system record security architecture comprising a record generation component configured to generate a record in a computing system, the record having an owner property that identifies a first user as an owner of the record, a record security component configured to control modification of the record based on the owner property of the record, and a record ownership transfer component configured to receive an indication of an ownership transfer of the record from the first user to a second user and to modify the owner property to identify the second user as the owner of the record.

Example 2 is the computing system record security architecture of any or all previous examples, wherein the record ownership transfer component is configured to send a first communication to the second user requesting the ownership transfer of the record and to receive the indication from the second user in response to the first communication, the indication indicating acceptance of the ownership transfer by the second user.

Example 3 is the computing system record security architecture of any or all previous examples, wherein the record ownership transfer component is configured to automatically modify the owner property in response to the indication received from the second user.

Example 4 is the computing system record security architecture of any or all previous examples, wherein the record ownership transfer component is configured to send a second communication to a set of users associated with the record, the second communication indicating the ownership transfer of the record from the first user to the second user.

Example 5 is the computing system record security architecture of any or all previous examples, wherein the record comprises an event record and the set of users comprise event invitees.

Example 6 is the computing system record security architecture of any or all previous examples, wherein the second communication includes a unique identifier of the second user and indicates the second user as an owner of the record.

Example 7 is the computing system record security architecture of any or all previous examples, wherein the second communication comprises an ownership transfer request that is sent to each of the set of users to update records stored for the set of users, and includes a unique identifier of the first user that indicates the first user as a sender of the ownership transfer request.

Example 8 is the computing system record security architecture of any or all previous examples, and further comprising an ownership discrepancy identification and correction component configured to identify and correct ownership discrepancies between the records of the set of users.

Example 9 is the computing system record security architecture of any or all previous examples, wherein the second communication comprises an email and the unique identifier of the first user is included in a protected header of the email that is controlled by an email server.

Example 10 is the computing system record security architecture of any or all previous examples, wherein the indication of the ownership transfer comprises a communication received from the first user, and wherein the record ownership transfer component is configured to modify the owner property based on an analysis of an identifier in the communication that identifies a sender of the communication.

Example 11 is the computing system record security architecture of any or all previous examples, wherein the owner property comprises a unique identifier that identifies the first user.

Example 12 is the computing system record security architecture of any or all previous examples, wherein the communication comprises an email and the identifier is stored in a protected header of the email.

Example 13 is the computing system record security architecture of any or all previous examples, wherein the record ownership transfer component is configured to modify the owner property if the identifier in the communication matches the owner property of the record.

Example 14 is a computer-implemented method comprising receiving an electronic message related to a record stored in a computing system, the electronic message comprises an ownership transfer request to transfer ownership of the record from a first user to a second user, analyzing the electronic message to identify a sender associated with the ownership transfer request, accessing the record to identify an owner property that identifies an owner of the record, comparing the owner property and the identification of the sender, and modifying the record, based on the comparison, to transfer ownership of the record from the first user to the second user.

Example 15 is the computer-implemented method of any or all previous, wherein the electronic message comprises an email, and wherein analyzing the electronic message comprises analyzing a protected header of the email.

Example 16 is the computer-implemented method of any or all previous, wherein the record comprises an event record that defines attributes of an event.

Example 17 is the computer-implemented method of any or all previous, and further comprising receiving a record modification request that requests modification of a record stored in a computing system by asserting an ownership privilege on the record, and processing the record modification request based on the owner property of the record.

Example 18 is the computer-implemented method of any or all previous, wherein the record comprises an event record that defines attributes of an event, and wherein the requested modification comprises at least one of updating or deleting the event record.

Example 19 is a computing system record security architecture comprising a record generation component configured to generate a record in a computing system, the record having an owner property that identifies a first user as an owner of the record, and a record ownership transfer component configured to identify a second user for which ownership transfer of the record is desired by the first user, send a first ownership transfer request to the second user that prompts the second user to accept the ownership transfer, receive a communication from the second user that indicates acceptance of the ownership transfer, and in response to receiving the communication from the second user, modify the owner property to identify the second user as the owner of the record and send a second ownership transfer request to a set of users associated with the record indicating the ownership transfer of the record from the first user to the second user.

Example 20 is the computing system record security architecture of any or all previous examples, wherein the record ownership transfer component is configured to modify the record to indicate an initiation of the ownership transfer by the first user, and modify the owner property, in response to receiving the communication from the second user, based on a determination that the first user initiated the ownership transfer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A computing system comprising:
   at least one processor; and
   memory storing instructions executable by the at least one processor, wherein the instructions, when executed, configure the computing system to provide:
      a record generation component configured to generate a record in a computing system, the record identifying a set of users associated with the record and having an owner property that identifies a first user as an owner of the record;
      a record security component configured to control modification of the record based on the owner property of the record; and
      a record ownership transfer component configured to:
         receive an indication of an ownership transfer that transfers ownership of the record from the first user to a second user;
         based on the received indication, modify the owner property to identify the second user as the owner of the record; and
         propagate the ownership transfer to the set of users by instructing an electronic messaging system to:
            for each respective user of the set of users,
               send a structured electronic message to a respective user computing system that is associated with the respective user and maintains a separate copy of the record having a corresponding owner property,
               wherein the structured electronic message includes:
                  a protected header field that is generated by the electronic messaging system and stores a unique identifier that identifies, to the respective user computing system, the first user as a sender of the structured electronic communication, wherein the protected header field is protected through control of the protected header field by the electronic messaging system; and
                  an instruction to the respective user computing system to modify the separate copy of the record to reflect the ownership transfer based on a comparison of the protected header field relative to the corresponding owner property on the separate copy of the record.

2. The computing system of claim 1, wherein the record ownership transfer component is configured to:
   send a request for the ownership transfer to the second user; and
   store a transfer request status indicator in associated with the record, the transfer request status indicator indicating that the request has been sent to the second user.

3. The computing system of claim 2, wherein the transfer request status indicator indicates the ownership transfer as a proposed transfer that requires the second user to accept or reject the request.

4. The computing system of claim 2, wherein the received indication comprises a response to the request that indicates acceptance of the ownership transfer by the second user, wherein the record ownership transfer component is configured to:
   modify the transfer request status indicator to indicate that the second user has accepted the request.

5. The computing system of claim 1, wherein the record comprises an event record and the set of users comprise event invitees.

6. The computing system of claim 1, wherein the structured electronic message identifies the second user as an owner of the record.

7. The computing system of claim 1, wherein the transfer request status indicator indicates the ownership transfer as pending.

8. The computing system of claim 1, and further comprising an ownership discrepancy identification and correction component configured to identify and correct ownership discrepancies between the separately maintained copies of the records.

9. The computing system of claim 1, wherein the structured electronic message comprises an email and the unique identifier of the first user is included in a protected header of the email that is controlled by an email server.

10. The computing system of claim 1, wherein the owner property corresponds to the unique identifier of the first user, the unique identifier being immutable with respect to the first user.

11. The computing system of claim 10, wherein the unique identifier of the first user is based on a combination of a mailbox identifier that identifies a mailbox assigned to the first user in the electronic messaging system and a unique object distinguished name that is assigned to the mailbox.

12. The computing system of claim 1, wherein the owner property comprises the unique identifier that identifies the first user, and wherein the indication of the ownership transfer comprises an email received from the first user, and wherein the record ownership transfer component is configured to modify the owner property based on an analysis of an identifier in a protected header of the email that identifies a sender of the email.

13. The computing system of claim 12, wherein the record ownership transfer component is configured to modify the owner property if the identifier in the email matches the owner property of the record.

14. A computer-implemented method comprising:
generating a record that identifies a set of users associated with the record and includes an owner property that identifies a first user as an owner of the record, wherein the record is stored in a computing system associated with a second user;
receiving, from a computing system associated with the first user, a structured electronic message that comprises an ownership transfer request to transfer ownership of the record from the first user to the second user;
analyzing a protected header field of the structured electronic message that stores a unique identifier that identifies the first user as a sender of the structured electronic communication, wherein the protected header field is protected through control of the protected header field by the computing system associated with the first user that sent the structured electronic message;
comparing the owner property and the unique identifier;
modifying the owner property in the record, based on the comparison, to transfer ownership of the record from the first user to the second user.

15. The computer-implemented method of claim 14, wherein the structured electronic message comprises an email, and wherein analyzing the structured electronic message comprises analyzing a protected header of the email.

16. The computer-implemented method of claim 15, wherein the record comprises an event record that defines attributes of an event.

17. The computer-implemented method of claim 14, and further comprising:
receiving a record modification request that requests modification of a record stored in a computing system by asserting an ownership privilege on the record; and
processing the record modification request based on the owner property of the record.

18. The computer-implemented method of claim 14, and further comprising:
receiving a request to modify the record; and
controlling modification of the record based on the owner property of the record.

19. A computing system comprising:
at least one processor; and
memory storing instructions executable by the at least one processor, wherein the instructions, when executed, configure the computing system to:
generate a record in a computing system, the record identifying a set of users associated with the record and having an owner property that identifies a first user as an owner of the record;
identify a second user to transfer ownership of the record;
send a first ownership transfer request to the second user that prompts the second user to accept the ownership transfer;
store a transfer request status indicator in association with the record, the transfer request status indicator indicating that the first ownership transfer request has been sent to the second user;
receive a communication from the second user that indicates acceptance of the ownership transfer;
modify the transfer request status indicator to indicate that the second user has accepted the ownership transfer; and
based on receiving the communication from the second user,
modify the owner property to identify the second user as the owner of the record; and
propagate the ownership transfer to the set of users by instructing an electronic messaging system to send, for each respective user of the set of users, a structured electronic message to a computing system associated with the respective user,
wherein the structured electronic message indicates the ownership transfer and includes a protected header field that is generated by the electronic messaging system and stores a unique identifier that identifies the first user as a sender of the structured electronic communication, wherein the protected header field is protected through control of the protected header field by the electronic messaging system.

20. The computing system of claim 19, wherein the transfer request status indicator indicates that the first user initiated the ownership transfer, and the record ownership transfer component is configured to:
modify the owner property, in response to receiving the communication from the second user, based on a determination that the first user initiated the ownership transfer.

* * * * *